(12) United States Patent
Lu et al.

(10) Patent No.: US 12,189,087 B2
(45) Date of Patent: Jan. 7, 2025

(54) OPTICAL IMAGING LENS ASSEMBLY

(71) Applicant: ZHEJIANG SUNNY OPTICS CO., LTD., Zhejiang (CN)

(72) Inventors: Jia Lu, Zhejiang (CN); Binqing Wang, Zhejiang (CN); Meng Yang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 771 days.

(21) Appl. No.: 17/400,145

(22) Filed: Aug. 12, 2021

(65) Prior Publication Data

US 2022/0082802 A1  Mar. 17, 2022

(30) Foreign Application Priority Data

Sep. 17, 2020 (CN) .......................... 202010981931.X

(51) Int. Cl.
  *G02B 13/00* (2006.01)
  *G02B 9/64* (2006.01)
  *G02B 27/00* (2006.01)

(52) U.S. Cl.
  CPC ........... *G02B 13/0045* (2013.01); *G02B 9/64* (2013.01); *G02B 27/0025* (2013.01)

(58) Field of Classification Search
  CPC ... G02B 13/0045; G02B 9/64; G02B 27/0025
  USPC .......................................................... 359/708
  See application file for complete search history.

(56) References Cited

U.S. PATENT DOCUMENTS

| | | | | |
|---|---|---|---|---|
| 2021/0389575 A1* | 12/2021 | Li | ............................ | G02B 9/64 |
| 2022/0057606 A1* | 2/2022 | Lu | ....................... | G02B 13/0045 |
| 2022/0128799 A1* | 4/2022 | Chen | ..................... | G02B 13/18 |
| 2022/0137339 A1* | 5/2022 | Kuo | .................... | G02B 13/0045 |
| | | | | 359/745 |

FOREIGN PATENT DOCUMENTS

CN          212647133 A        3/2021

* cited by examiner

*Primary Examiner* — Sharrief I Broome
(74) *Attorney, Agent, or Firm* — Samson G. Yu

(57) ABSTRACT

The disclosure discloses an optical imaging lens assembly, which sequentially includes, from an object side to an image side along an optical axis, a first lens with a positive refractive power, a second lens with a positive refractive power, a third lens with a negative refractive power, a fourth lens, a fifth lens, a sixth lens, a seventh lens, an eighth lens, a ninth lens with a positive refractive power, and a tenth lens with a negative refractive power, wherein a spacing distance TTL from an object-side surface of the first lens to an imaging surface of the optical imaging lens assembly on the optical axis and an Entrance Pupil Diameter (EPD) of the optical imaging lens assembly meet TTL/EPD<2.0.

18 Claims, 12 Drawing Sheets

OPTICAL IMAGING LENS ASSEMBLY

CROSS-REFERENCE TO RELATED APPLICATION

The disclosure claims priority to and the benefit of Chinese Patent Present invention No. 202010981931.X, filed in the China National Intellectual Property Administration (CNIPA) on 17 Sep. 2020, which is incorporated herein by reference in its entirety.

TECHNICAL FIELD

The disclosure relates to the field of optical elements, and more particularly to an optical imaging lens assembly.

BACKGROUND

With the development of 5th-Generation (5G) technologies, portable devices such as mobile phones are updated and upgraded increasingly frequently, and both software and hardware are updated for new technology times. The smart phone market is vast, and application scenes are continuously extended.

People like collecting and shooting pictures or videos to record details in daily life, and thus have high expectations to the shooting performance of mobile phones. Mobile lens, as an important component of mobile phone for acquiring environmental information, plays a greater role in application scenes of the 5G era. In development directions of mobile lenses, large-aperture lenses are widely favored by mobile developers. A large-aperture lens is crucial to photographing with a mobile phone. By enlarging the aperture, a luminous flux of the mobile phone may be improved, and the quality of a picture may further be improved. However, improvement of the luminous flux also means a greater noise in an imaging process, which is unfavorable for improving the imaging quality of an optical imaging lens assembly.

In order to meet an assembling requirement of a mobile phone as well as an imaging requirement, there is a need for an optical imaging lens assembly that is portable, large in aperture, high in resolution, or high in distant and close view imaging quality.

SUMMARY

In an embodiment of the disclosure provides an optical imaging lens assembly, which sequentially includes, from an object side to an image side along an optical axis, a first lens with a positive refractive power, a second lens with a positive refractive power, a third lens with a negative refractive power, a fourth lens, a fifth lens, a sixth lens, a seventh lens, an eighth lens, a ninth lens with a positive refractive power, and a tenth lens with a negative refractive power, wherein a spacing distance TTL from an object-side surface of the first lens to an imaging surface of the optical imaging lens assembly on the optical axis and an Entrance Pupil Diameter (EPD) of the optical imaging lens assembly may meet TTL/EPD<2.0.

In an implementation mode, the object-side surface of the first lens to an image-side surface of the tenth lens include at least one aspheric mirror surface.

In an implementation mode, an effective focal length f1 of the first lens and an effective focal length f3 of the third lens may meet $-1.5 < f1/f3 \times 10 < 0$.

In an implementation mode, a curvature radius R3 of an object-side surface of the second lens, a curvature radius R4 of an image-side surface of the second lens, and an effective focal length f2 of the second lens may meet $0 < (R3+R4)/f2 < 4.7$.

In an implementation mode, an effective focal length f6 of the sixth lens, an effective focal length f10 of the tenth lens, and an effective focal length f8 of the eighth lens may meet $0.5 < (f6+f10)/f8 < 1.3$.

In an implementation mode, an effective focal length f7 of the seventh lens and an effective focal length f9 of the ninth lens may meet $1.3 < f7/f9 < 2.4$.

In an implementation mode, a total effective focal length f of the optical imaging lens assembly and the Entrance Pupil Diameter (EPD) of the optical imaging lens assembly may meet $f/EPD < 1.5$.

In an implementation mode, ImgH is a half of a diagonal length of an effective pixel region on the imaging surface of the optical imaging lens assembly, a center thickness CT9 of the ninth lens on the optical axis, and a spacing distance T910 of the ninth lens and the tenth lens on the optical axis and ImgH may meet $1.8 < ImgH/(CT9+T910) < 2.6$.

In an implementation mode, a combined focal length f123 of the first lens, the second lens, and the third lens, and the total effective focal length f of the optical imaging lens assembly may meet $1.5 < f123/f < 2.5$.

In an implementation mode, a combined focal length f78 of the seventh lens and the eighth lens and a combined focal length f1234 of the first lens, the second lens, the third lens, and the fourth lens may meet $1.4 < f78/f1234 < 2.7$.

In the exemplary implementation mode, a combined focal length f12 of the first lens and the second lens and a combined focal length f56 of the fifth lens and the sixth lens may meet $-0.7 < f12/f56 < -0.1$.

In an implementation mode, an on-axis distance SAG32 from an intersection point of an image-side surface of the third lens and the optical axis to an effective radius vertex of the image-side surface of the third lens and an on-axis distance SAG42 from an intersection point of an image-side surface of the fourth lens and the optical axis to an effective radius vertex of the image-side surface of the fourth lens may meet $1.1 < SAG32/SAG42 < 1.6$.

In an implementation mode, an on-axis distance SAG101 from an intersection point of an object-side surface of the tenth lens and the optical axis to an effective radius vertex of the object-side surface of the tenth lens and an on-axis distance SAG102 from an intersection point of the image-side surface of the tenth lens and the optical axis to an effective radius vertex of the image-side surface of the tenth lens may meet $2.1 < SAG101/SAG102 < 5.0$.

In an implementation mode, there is an air space between any two adjacent lenses in the first lens to the tenth lens on the optical axis.

In an implementation mode, the object-side surface of the second lens is a convex surface, and the image-side surface of the second lens is a concave surface; and an object-side surface of the third lens is a convex surface, and the image-side surface of the third lens is a concave surface.

In another embodiment of the disclosure provides an optical imaging lens assembly, which sequentially includes, from an object side to an image side along an optical axis, a first lens with a positive refractive power, a second lens with a positive refractive power, a third lens with a negative refractive power, a fourth lens, a fifth lens, a sixth lens, a seventh lens, an eighth lens, a ninth lens with a positive refractive power, and a tenth lens with a negative refractive power, wherein an effective focal length f1 of the first lens and an effective focal length f3 of the third lens may meet $-1.5 < f1/f3 \times 10 < 0$.

In an implementation mode, a curvature radius R3 of an object-side surface of the second lens, a curvature radius R4 of an image-side surface of the second lens, and an effective focal length f2 of the second lens may meet $0<(R3+R4)/f2<4.7$.

In an implementation mode, a spacing distance TTL from an object-side surface of the first lens to an imaging surface of the optical imaging lens assembly on the optical axis and an Entrance Pupil Diameter (EPD) of the optical imaging lens assembly may meet TTL/EPD<2.0.

In an implementation mode, an effective focal length f6 of the sixth lens, an effective focal length f10 of the tenth lens, and an effective focal length f8 of the eighth lens may meet $0.5<(f6+f10)/f8<1.3$.

In an implementation mode, an effective focal length f7 of the seventh lens and an effective focal length f9 of the ninth lens may meet $1.3<f7/f9<2.4$.

In an implementation mode, a total effective focal length f of the optical imaging lens assembly and the Entrance Pupil Diameter (EPD) of the optical imaging lens assembly may meet f/EPD<1.5.

In an implementation mode, ImgH is a half of a diagonal length of an effective pixel region on the imaging surface of the optical imaging lens assembly, a center thickness CT9 of the ninth lens on the optical axis, and a spacing distance T910 of the ninth lens and the tenth lens on the optical axis and ImgH may meet $1.8<ImgH/(CT9+T910)<2.6$.

In an implementation mode, a combined focal length f123 of the first lens, the second lens, and the third lens, and the total effective focal length f of the optical imaging lens assembly may meet $1.5<f123/f<2.5$.

In an implementation mode, a combined focal length f78 of the seventh lens and the eighth lens and a combined focal length f1234 of the first lens, the second lens, the third lens, and the fourth lens may meet $1.4<f78/f1234<2.7$.

In the exemplary implementation mode, a combined focal length f12 of the first lens and the second lens and a combined focal length f56 of the fifth lens and the sixth lens may meet $-0.7<f12/f56<-0.1$.

In an implementation mode, an on-axis distance SAG32 from an intersection point of an image-side surface of the third lens and the optical axis to an effective radius vertex of the image-side surface of the third lens and an on-axis distance SAG42 from an intersection point of an image-side surface of the fourth lens and the optical axis to an effective radius vertex of the image-side surface of the fourth lens may meet $1.1<SAG32/SAG42<1.6$.

In an implementation mode, an on-axis distance SAG101 from an intersection point of an object-side surface of the tenth lens and the optical axis to an effective radius vertex of the object-side surface of the tenth lens and an on-axis distance SAG102 from an intersection point of the image-side surface of the tenth lens and the optical axis to an effective radius vertex of the image-side surface of the tenth lens may meet $2.1<SAG101/SAG102<5.0$.

In an implementation mode, there is an air space between any two adjacent lenses in the first lens to the tenth lens on the optical axis.

In an implementation mode, the object-side surface of the second lens is a convex surface, and the image-side surface of the second lens is a concave surface; and an object-side surface of the third lens is a convex surface, and the image-side surface of the third lens is a concave surface.

According to the disclosure, the ten lenses are adopted, and the refractive power and surface types of each lens, the center thickness of each lens, on-axis distances between the lenses, and the like are reasonably configured to achieve at least one beneficial effect of relatively high imaging quality of distant views and close views, large aperture, high resolution, and the like of the optical imaging lens assembly. The optical imaging lens assembly may have satisfactory imaging effects in different environments.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
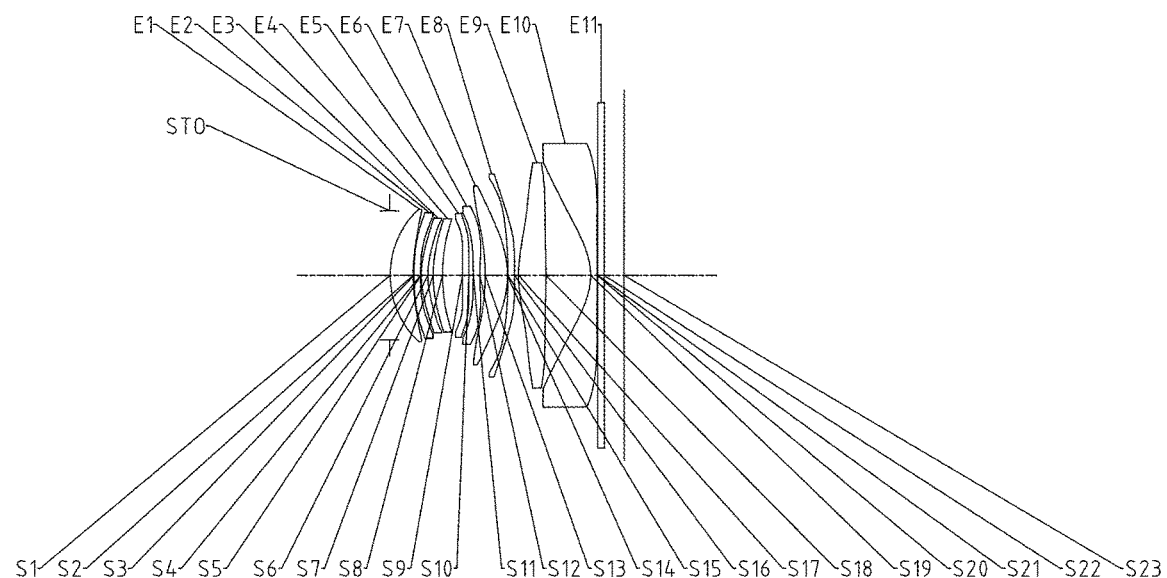
FIG. 1 is a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include, for example, ten lenses with refractive power, i.e., a first lens, a second lens, a third lens, a fourth lens, a fifth lens, a sixth lens, a seventh lens, an eighth lens, a ninth lens, and a tenth lens. The ten lenses are sequentially arranged from an object side to an image side along an optical axis. There may be an air space between any two adjacent lenses in the first lens to the tenth lens.

In the exemplary implementation mode, the first lens may have a positive refractive power; the second lens has a positive refractive power; the third lens may have a negative refractive power; the fourth lens has a positive refractive power or a negative refractive power; the fifth lens has a positive refractive power or a negative refractive power; the sixth lens has a positive refractive power or a negative refractive power; the seventh lens has a positive refractive power or a negative refractive power; the eighth lens has a positive refractive power or a negative refractive power; the ninth lens may have a positive refractive power; and the tenth lens may have a negative refractive power. The first lens with a positive refractive power in the optical imaging lens assembly converges light. The second lens with a positive refractive power and the third lens with a negative refractive power are carried, so that the refractive power of the optical imaging lens assembly may be reasonably configured and prevented from being excessively concentrated on one lens, marginal rays may be converged relatively well on the imaging surface, correction of a coma of the optical imaging lens assembly is facilitated, and the optical imaging lens assembly is endowed with relatively high imaging quality. The ninth lens with a positive refractive power and the tenth lens with a negative refractive power are favorable for optimizing a field curvature of the optical imaging lens assembly, reducing a dispersion of the optical imaging lens assembly, and improving a field curvature staggering phenomenon of the optical imaging lens assembly.

In the exemplary implementation mode, an object-side surface of the second lens may be a convex surface, and an image-side surface of the second lens may be a concave surface; and an object-side surface of the third lens may be a convex surface, and an image-side surface of the third lens may be a concave surface. Surface types of the object-side surfaces and image-side surfaces of the second lens and the third lens may be controlled to help to optimize a spherical aberration and chromatic aberration of the optical imaging lens assembly.

In the exemplary implementation mode, the optical imaging lens assembly may further include at least one diaphragm. The diaphragm may be arranged at a proper position as required, for example, arranged between the object side and the first lens. Optionally, the optical imaging lens assembly may further include an optical filter configured to correct the chromatic aberration and/or protective glass configured to protect a photosensitive element on the imaging surface.

In the exemplary implementation mode, the lenses in the first lens to the tenth lens are independent of one another. Exemplarily, there is an air space between any two adjacent lenses in the first lens to the tenth lens on the optical axis. The lenses may be controlled to be independent of one another and particularly form the air spaces on the optical axis to ensure that the imaging lens is high in machinability and may be formed and assembled better.

In the exemplary implementation mode, the optical imaging lens assembly of the disclosure may meet a conditional expression TTL/EPD<2.0, wherein TTL is a spacing distance from an object-side surface of the first lens to an imaging surface of the optical imaging lens assembly on the optical axis, and EPD is an Entrance Pupil Diameter of the optical imaging lens assembly. The optical imaging lens assembly meets TTL/EPD<2.0, so that a large aperture is ensured, meanwhile, a Total Track Length (TTL) of the optical imaging lens assembly may further be reduced, and the characteristics of small size and high imaging quality are achieved. More specifically, TTL and EPD may meet 1.80<TTL/EPD<1.95.

In the exemplary implementation mode, the optical imaging lens assembly of the disclosure may meet a conditional expression −1.5<f1/f3×10<0, wherein f1 is an effective focal length of the first lens, f3 is an effective focal length of the third lens. The optical imaging lens assembly meets −1.5<f1/f3×10<0, so that excessive concentration of refractive power on the first lens may be avoided, meanwhile, reduction of the sensitivity of the third lens is facilitated, and the third lens is higher in machinability. More specifically, f1 and f3 may meet $-1.10<f1/f3\times10<-0.20$.

In the exemplary implementation mode, the optical imaging lens assembly of the disclosure may meet a conditional expression $0<(R3+R4)/f2<4.7$, wherein R3 is a curvature radius of the object-side surface of the second lens, R4 is a curvature radius of the image-side surface of the second lens, and f2 is an effective focal length of the second lens. The optical imaging lens assembly of the disclosure has a large aperture, but incidence angles and emergence angles of part of rays under the diaphragm may usually be too large, so the optical imaging lens assembly may be controlled to meet $0<(R3+R4)/f2<4.7$ to restrict the curvature radii of the object-side and image-side surfaces of the second lens to help to retard deflection of rays, reduce the overall sensitivity of the optical imaging lens assembly and further improve the imaging effect of the optical imaging lens assembly.

In the exemplary implementation mode, the optical imaging lens assembly of the disclosure may meet a conditional expression $0.5<(f6+f10)/f8<1.3$, wherein f6 is an effective focal length of the sixth lens, f10 is an effective focal length of the tenth lens, and f8 is an effective focal length of the eighth lens. The optical imaging lens assembly meets $0.5<(f6+f10)/f8<1.3$, so that the refractive power of the sixth lens, the eighth lens, and the tenth lens may be configured reasonably to further help to eliminate the aberration, reduce a second-order spectrum of the optical imaging lens assembly, and further improve the imaging quality of the optical imaging lens assembly. More specifically, f6, f10, and f8 may meet $0.65<(f6+f10)/f8<1.20$.

In the exemplary implementation mode, the optical imaging lens assembly of the disclosure may meet a conditional expression $1.3<f7/f9<2.4$, wherein f7 is an effective focal length of the seventh lens, and f9 is an effective focal length of the ninth lens. The optical imaging lens assembly meets $1.3<f7/f9<2.4$, so that the size of the optical imaging lens assembly may be reduced effectively on one hand, excessive concentration of the refractive power of the optical imaging lens assembly on a certain lens is avoided on the other hand, and in addition, spherical aberration contributions of the two lenses may be controlled in a reasonable range to achieve higher imaging quality of the optical imaging lens assembly. More specifically, f7 and f9 may meet $1.38<f7/f9<2.36$.

In the exemplary implementation mode, the optical imaging lens assembly of the disclosure may meet a conditional expression $f/EPD<1.5$, wherein f is a total effective focal length of the optical imaging lens assembly, and EPD is the Entrance Pupil Diameter of the optical imaging lens assembly. The optical imaging lens assembly meets $f/EPD<1.5$, so that enlargement of a clear aperture is facilitated to achieve effects of improving a luminous flux and improving the quality of a shot picture. More specifically, f and EPD may meet $1.30<f/EPD<1.44$.

In the exemplary implementation mode, the optical imaging lens assembly of the disclosure may meet a conditional expression $1.8<ImgH/(CT9+T910)<2.6$, wherein ImgH is a half of a diagonal length of an effective pixel region on the imaging surface of the optical imaging lens assembly, CT9 is a center thickness of the ninth lens on the optical axis, and T910 is a spacing distance of the ninth lens and the tenth lens on the optical axis. The optical imaging lens assembly meets $1.8<ImgH/(CT9+T910)<2.6$, so that achievement of a forming characteristic of the lens, retarding of light deflection at the lens, and reduction of the sensitivity of the lens are ensured on one hand, and on the other hand, the TTL of the optical imaging lens assembly may be reduced to meet a miniaturization requirement. More specifically, ImgH, CT9, and T910 may meet $1.92<ImgH/(CT9+T910)<2.50$.

In the exemplary implementation mode, the optical imaging lens assembly of the disclosure may meet a conditional expression $1.5<f123/f<2.5$, wherein f123 is a combined focal length of the first lens, the second lens, and the third lens, and f is the total effective focal length of the optical imaging lens assembly. The optical imaging lens assembly meets $1.5<f123/f<2.5$, so that an object-side end of the optical imaging lens assembly may have a sufficient converging capability to regulate a focusing position of beams to further reduce the TTL of the optical imaging lens assembly. Specifically, f123 and f may meet $1.60<f123/f<2.20$.

In the exemplary implementation mode, the optical imaging lens assembly of the disclosure may meet a conditional expression $1.4<f78/f1234<2.7$, wherein f78 is a combined focal length of the seventh lens and the eighth lens, and f1234 is a combined focal length of the first lens, the second lens, the third lens, and the fourth lens. The optical imaging lens assembly meets $1.4<f78/f1234<2.7$, so that the refractive power of each lens may be configured reasonably to further facilitate reasonable spatial distribution of the refractive power of each lens and reduce the aberration of the optical imaging lens assembly.

In the exemplary implementation mode, the optical imaging lens assembly of the disclosure may meet a conditional expression $-0.7<f12/f56<-0.1$, wherein f12 is a combined focal length of the first lens and the second lens, and f56 is a combined focal length of the fifth lens and the sixth lens. The optical imaging lens assembly meets $-0.7<f12/f56<-0.1$, so that the tolerance sensitivity of the optical imaging lens assembly may be reduced, and the optical imaging lens assembly may be kept small. Specifically, f12 and f56 may meet $-0.64<f12/f56<-0.19$.

In the exemplary implementation mode, the optical imaging lens assembly of the disclosure may meet a conditional expression $1.1<SAG32/SAG42<1.6$, wherein SAG32 is an on-axis distance from an intersection point of an image-side surface of the third lens and the optical axis to an effective radius vertex of the image-side surface of the third lens, and SAG42 is an on-axis distance from an intersection point of an image-side surface of the fourth lens and the optical axis to an effective radius vertex of the image-side surface of the fourth lens. The optical imaging lens assembly meets $1.1<SAG32/SAG42<1.6$, so that uniform transition between an aperture of the third lens and an aperture of the fourth lens is facilitated, the two lenses may structurally lean against each other, and may be stressed uniformly, and the machinability of the two lenses may also be ensured favorably.

In the exemplary implementation mode, the optical imaging lens assembly of the disclosure may meet a conditional expression $2.1<SAG101/SAG102<5.0$, wherein SAG101 is an on-axis distance from an intersection point of an object-side surface of the tenth lens and the optical axis to an effective radius vertex of the object-side surface of the tenth lens, and SAG102 is an on-axis distance from an intersection point of an image-side surface of the tenth lens and the optical axis to an effective radius vertex of the image-side surface of the tenth lens. The optical imaging lens assembly meets $2.1<SAG101/SAG102<5.0$, so that manufacturing of the lens is facilitated, and undesirable phenomena in a lens forming process may be avoided.

The optical imaging lens assembly according to the implementation mode of the disclosure may adopt multiple lenses, for example, the abovementioned ten lenses. The refractive power and surface types of each lens, the center thickness of each lens, on-axis distances between the lenses and the like are reasonably configured to effectively reduce the size of the optical imaging lens assembly, reduce the sensitivity of the optical imaging lens assembly, improve the machinability of the optical imaging lens assembly and ensure that the optical imaging lens assembly is more favorable for production and machining and applicable to a portable electronic product. In addition, the optical imaging lens assembly of the disclosure also has high optical performance such as large aperture, high resolution, and portability. The optical imaging lens assembly has high imaging quality for distant views and close views, and may have satisfactory imaging effects in different environments.

In the implementation mode of the disclosure, at least one of the mirror surfaces of each lens is an aspheric mirror surface, namely at least one of the object-side surface of the first lens to the image-side surface of the tenth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens, the seventh lens, the eighth lens, the ninth lens, and the tenth lens is an aspheric mirror surface. Optionally, the object-side surface and image-side surface of each lens in the first lens, the second lens, the third lens, the fourth lens, the fifth lens, the sixth lens, the seventh lens, the eighth lens, the ninth lens, and the tenth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with ten lenses as an example, the optical imaging lens assembly is not limited to ten lenses. If necessary, the optical imaging lens assembly may further include another number of lenses.

Specific embodiments applied to the optical imaging lens assembly of the abovementioned implementation mode will further be described below with reference to the drawings.

Embodiment 1

An optical imaging lens assembly according to embodiment 1 of the disclosure will be described below with reference to FIG. 1 to FIG. 2C. FIG. 1 is a structure diagram of an optical imaging lens assembly according to embodiment 1 of the disclosure.

As shown in FIG. 1, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. The seventh lens E7 has a positive refractive power, an object-side surface S13 thereof is a concave surface, while an image-side surface S14 is a convex surface. The eighth lens E8 has a negative refractive power, an object-side surface S15 thereof is a concave surface, while an image-side surface S16 is a convex surface. The ninth lens E9 has a positive refractive power, an object-side surface S17 thereof is a convex surface, while an image-side surface S18 is a convex surface. The tenth lens E10 has a negative refractive power, an object-side surface S19 thereof is a concave surface, while an image-side surface S20 is a convex surface. The optical filter E11 has an object-side surface S21 and an image-side surface S22. The optical imaging lens assembly has an imaging surface S23. Light from an object sequentially penetrates through each of the surfaces S1 to S22, and is finally imaged on the imaging surface S23.

Table 1 is a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0200 | | | | |
| S1 | Aspheric | 2.9532 | 0.7425 | 1.55 | 52.5 | 11.36 | 0.0000 |
| S2 | Aspheric | 5.0988 | 0.0337 | | | | 0.0000 |
| S3 | Aspheric | 14.5255 | 0.2100 | 1.67 | 19.2 | 2316.43 | 0.0000 |
| S4 | Aspheric | 14.5768 | 0.0200 | | | | 0.0000 |
| S5 | Aspheric | 2.8458 | 0.2124 | 1.67 | 19.2 | −126.75 | 0.0000 |
| S6 | Aspheric | 2.6713 | 0.1767 | | | | 0.0000 |
| S7 | Aspheric | 4.6139 | 0.3027 | 1.58 | 32.8 | 31.05 | 0.0000 |
| S8 | Aspheric | 6.0252 | 0.6397 | | | | 0.0000 |
| S9 | Aspheric | 37.1486 | 0.2106 | 1.66 | 19.8 | 39.91 | 0.0000 |
| S10 | Aspheric | −92.6709 | 0.1425 | | | | 0.0000 |

TABLE 1-continued

| Surface number | Surface type | Curvature radius | Thickness/ distance | Material Refractive index | Abbe number | Focal length | Conic coefficient |
|---|---|---|---|---|---|---|---|
| S11 | Aspheric | −127.5842 | 0.2129 | 1.58 | 31.3 | −13.04 | 0.0000 |
| S12 | Aspheric | 8.0828 | 0.1734 | | | | 0.0000 |
| S13 | Aspheric | −8.0368 | 0.7212 | 1.63 | 22.8 | 7.99 | 0.0000 |
| S14 | Aspheric | −3.2302 | 0.0200 | | | | −1.0000 |
| S15 | Aspheric | −10.0161 | 0.2100 | 1.58 | 35.9 | −20.73 | 0.0000 |
| S16 | Aspheric | −61.2579 | 0.1258 | | | | 0.0000 |
| S17 | Aspheric | 4.2477 | 0.8938 | 1.58 | 33.5 | 5.72 | −1.0000 |
| S18 | Aspheric | −14.5720 | 1.4429 | | | | 0.0000 |
| S19 | Aspheric | −2.1109 | 0.2100 | 1.58 | 30.5 | −3.74 | −1.0000 |
| S20 | Aspheric | −63.8017 | 0.0225 | | | | 0.0000 |
| S21 | Spherical | Infinite | 0.2100 | 1.52 | 64.2 | | |
| S22 | Spherical | Infinite | 0.6400 | | | | |
| S23 | Spherical | Infinite | | | | | |

In embodiment 1, a value of a total effective focal length f of the optical imaging lens assembly is 5.44 mm, a value of an on-axis distance TTL from the object-side surface S1 of the first lens E1 to the imaging surface S23 is 7.57 mm, and a value of ImgH is a half of a diagonal length of an effective pixel region on the imaging surface S23, ImgH is 4.79 mm.

In embodiment 1, both the object-side surface and image-side surface of any lens in the first lens E1 to the tenth lens E10 are aspheric surfaces, and a surface type x of each aspheric lens may be defined through, but not limited to, the following aspheric surface formula:

$$x = \frac{ch^2}{1 + \sqrt{1 - (k+1)c^2h^2}} + \Sigma A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients $A_4$, $A_6$, $A_8$, $A_{10}$, $A_{12}$, $A_{14}$, and $A_{16}$, $A_{18}$ and $A_{20}$ applied to each of the aspheric mirror surfaces S1-S20 in embodiment 1.

TABLE 2

| Surface number | A4 | A6 | A8 | A10 | A12 | A14 | A16 |
|---|---|---|---|---|---|---|---|
| S1 | −1.4550E−02 | 2.7773E−02 | −2.2173E−02 | 8.8879E−03 | −1.8823E−03 | 2.0157E−04 | −8.6078E−06 |
| S2 | −2.7976E−02 | 1.8744E−02 | −1.0534E−02 | 3.7325E−03 | −7.8104E−04 | 8.8549E−05 | −4.2099E−06 |
| S3 | 2.8243E−02 | 4.8562E−03 | −9.5330E−03 | 3.7322E−03 | −6.7392E−04 | 5.6781E−05 | −1.6857E−06 |
| S4 | 7.0437E−02 | −3.3161E−02 | 1.5402E−02 | −6.8741E−03 | 2.0026E−03 | −3.1398E−04 | 2.0152E−05 |
| S5 | −2.8779E−02 | −5.0946E−03 | 7.5108E−03 | −4.2920E−03 | 1.4322E−03 | −2.5020E−04 | 1.7288E−05 |
| S6 | −4.5556E−02 | 1.6433E−02 | −1.2844E−02 | 7.0296E−03 | −2.1331E−03 | 3.6495E−04 | −2.6850E−05 |
| S7 | 7.4568E−03 | −9.1987E−03 | 7.2542E−03 | −5.3091E−03 | 2.0780E−03 | −3.9264E−04 | 2.9601E−05 |
| S8 | 1.2603E−03 | 4.2140E−03 | −3.0091E−03 | 3.7710E−04 | 2.2625E−04 | −8.8449E−05 | 1.0186E−05 |
| S9 | −6.0308E−04 | −1.4019E−02 | 3.2184E−03 | −2.3312E−03 | 1.2865E−03 | −2.8222E−04 | 2.2952E−05 |
| S10 | 5.7844E−03 | −1.5910E−02 | 5.5369E−03 | −2.1749E−03 | 7.1344E−04 | −1.1398E−04 | 7.1020E−06 |
| S11 | −3.6044E−02 | −3.5874E−03 | 1.0841E−02 | −4.6032E−03 | 7.4956E−04 | −3.0900E−05 | −1.8975E−06 |
| S12 | −5.0799E−02 | 6.2743E−03 | 2.6134E−03 | −1.2522E−03 | 1.2903E−04 | 8.5209E−06 | −1.3608E−06 |
| S13 | −9.1256E−03 | 3.3175E−03 | −1.2424E−04 | −8.0646E−05 | 1.5177E−05 | −1.0891E−06 | 2.8375E−08 |
| S14 | −1.4328E−03 | 3.7937E−03 | −1.2440E−03 | 2.5321E−04 | −2.8845E−05 | 1.6154E−06 | −3.4742E−08 |
| S15 | 1.8181E−02 | −1.0376E−02 | 3.3092E−03 | −6.2681E−04 | 6.6309E−05 | −3.6443E−06 | 8.1892E−08 |
| S16 | −1.6964E−02 | −3.7624E−03 | 2.4409E−03 | −4.6225E−04 | 4.3263E−05 | −2.0381E−06 | 3.8526E−08 |
| S17 | −2.1519E−02 | 2.8790E−03 | −2.7964E−04 | 2.0124E−05 | −9.7379E−07 | 2.7652E−08 | −3.4355E−10 |
| S18 | 1.3090E−02 | −2.6014E−03 | 2.9983E−04 | −2.2246E−05 | 1.0057E−06 | −2.4589E−08 | 2.4748E−10 |
| S19 | 2.0334E−02 | −1.9859E−03 | 2.3743E−04 | −2.4507E−05 | 1.5411E−06 | −5.0141E−08 | 6.4328E−10 |
| S20 | 3.5819E−03 | −5.9831E−04 | 3.8442E−05 | −1.4929E−06 | 3.4582E−08 | −4.1760E−10 | 1.9190E−12 |

Figure 2A:
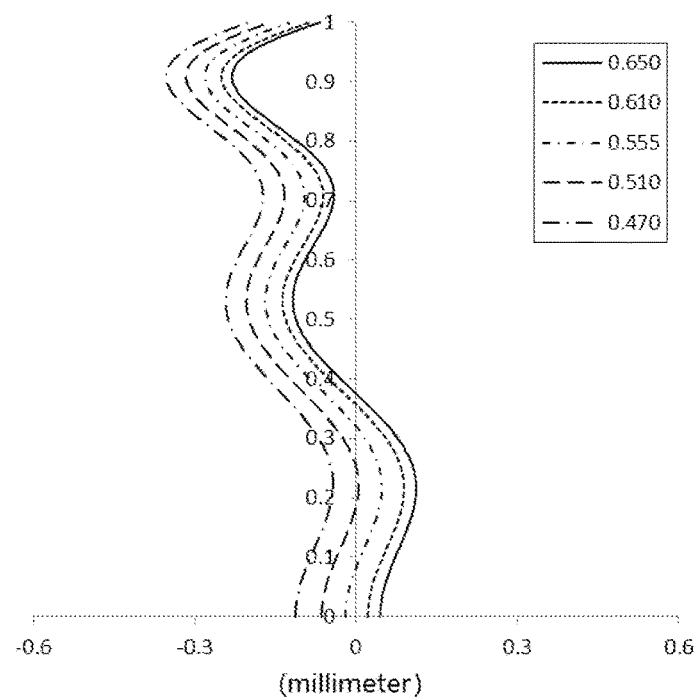
FIG. 2A to FIG. 2C show a longitudinal aberration curve, an astigmatism curve, and a distortion curve of an optical imaging lens assembly according to embodiment 1 respectively.
Figure 2B:
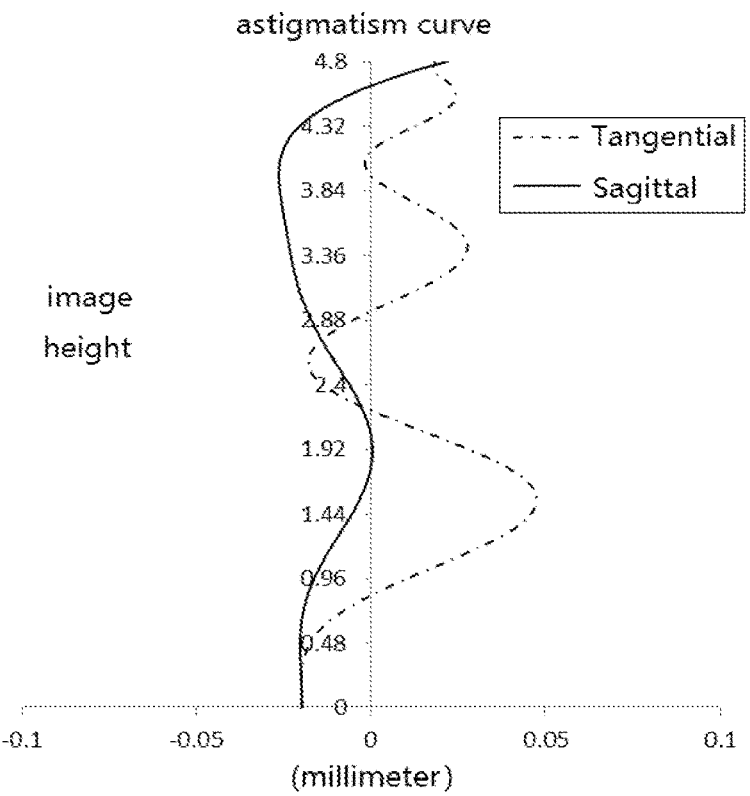
Figure 2C:
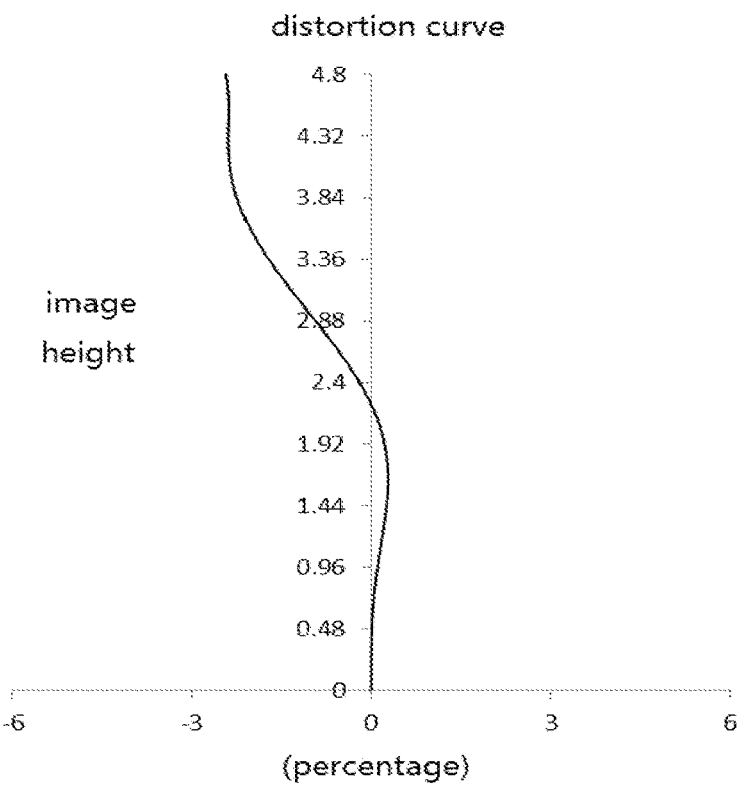

FIG. 2A shows a longitudinal aberration curve of the optical imaging lens assembly according to embodiment 1 to represent deviation of a convergence focal point after light with different wavelengths passes through the lens. FIG. 2B shows an astigmatism curve of the optical imaging lens assembly according to embodiment 1 to represent a meridian image surface curvature and a sagittal image surface curvature. FIG. 2C shows a distortion curve of the optical imaging lens assembly according to embodiment 1 to represent distortion values corresponding to different image heights. According to FIG. 2A to FIG. 2C, it can be seen that the optical imaging lens assembly provided in embodiment 1 may achieve high imaging quality.

Embodiment 2

Figure 3:
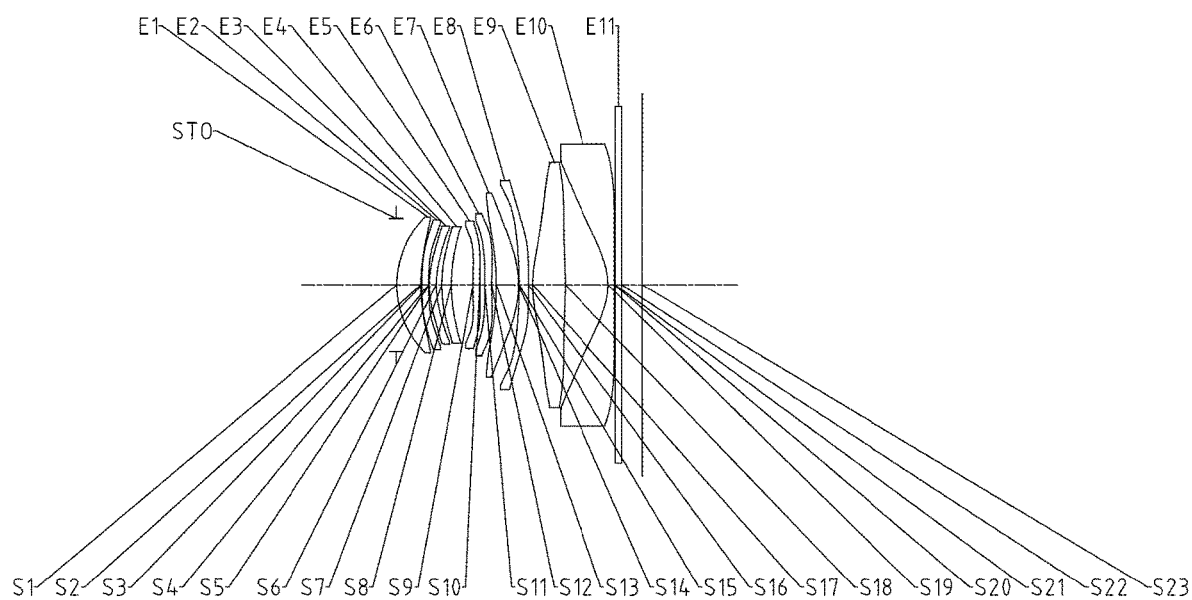
FIG. 3 is a structure diagram of an optical imaging lens assembly according to embodiment 2 of the disclosure.

An optical imaging lens assembly according to embodiment 2 of the disclosure will be described below with reference to FIG. 3 to FIG. 4C. In the embodiment and the following embodiments, part of descriptions similar to those about embodiment are omitted for simplicity. FIG. 3 is a structure diagram of an optical imaging lens assembly according to embodiment 2 of the disclosure.

As shown in FIG. 3, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a negative refractive power, an object-side surface S15 thereof is a concave surface, while an image-side surface S16 is a convex surface. The ninth lens E9 has a positive refractive power, an object-side surface S17 thereof is a convex surface, while an image-side surface S18 is a convex surface. The tenth lens E10 has a negative refractive power, an object-side surface S19 thereof is a concave surface, while an image-side surface S20 is a convex surface. The optical filter E11 has an object-side surface S21 and an image-side surface S22. The optical imaging lens assembly has an imaging surface S23. Light from an object sequentially penetrates through each of the surfaces S1 to S22, and is finally imaged on the imaging surface S23.

In embodiment 2, a value of a total effective focal length f of the optical imaging lens assembly is 5.57 mm, a value of an on-axis distance TTL from the object-side surface S1 of the first lens E1 to the imaging surface S23 is 7.73 mm, and a value of ImgH is a half of a diagonal length of an effective pixel region on the imaging surface S23, ImgH is 4.89 mm.

Table 3 is a basic parameter table of the optical imaging lens assembly of embodiment 2, and units of the curvature radius, the thickness/distance and the focal length are all mm. Table 4 shows high-order coefficients applied to each aspheric mirror surface in embodiment 2. A surface type of each aspheric surface may be defined by the formula (1) given in embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0200 | | | | |
| S1 | Aspheric | 2.9967 | 0.7538 | 1.55 | 50.2 | 12.84 | 0.0000 |
| S2 | Aspheric | 4.7204 | 0.0363 | | | | 0.0000 |
| S3 | Aspheric | 14.2332 | 0.2100 | 1.67 | 19.0 | 81.46 | 0.0000 |
| S4 | Aspheric | 19.0836 | 0.0208 | | | | 0.0000 |
| S5 | Aspheric | 2.8649 | 0.2169 | 1.66 | 19.9 | −293.39 | 0.0000 |
| S6 | Aspheric | 2.7381 | 0.1770 | | | | 0.0000 |
| S7 | Aspheric | 4.6493 | 0.3018 | 1.60 | 29.3 | 32.99 | 0.0000 |
| S8 | Aspheric | 5.9268 | 0.6806 | | | | 0.0000 |
| S9 | Aspheric | 59.7033 | 0.2100 | 1.64 | 21.5 | −1149.29 | 0.0000 |
| S10 | Aspheric | 55.1785 | 0.1548 | | | | 0.0000 |
| S11 | Aspheric | 53.8890 | 0.2186 | 1.58 | 34.3 | −18.06 | 0.0000 |
| S12 | Aspheric | 8.7943 | 0.1470 | | | | 0.0000 |
| S13 | Aspheric | −9.5433 | 0.6968 | 1.63 | 23.7 | 8.35 | 0.0000 |
| S14 | Aspheric | −3.4931 | 0.0218 | | | | 0.0000 |
| S15 | Aspheric | −10.2117 | 0.2922 | 1.58 | 33.3 | −18.19 | 0.0000 |
| S16 | Aspheric | −314.0659 | 0.1354 | | | | 0.0000 |
| S17 | Aspheric | 4.0637 | 1.0259 | 1.59 | 30.7 | 5.27 | −1.0000 |
| S18 | Aspheric | −12.4215 | 1.3533 | | | | 0.0000 |

TABLE 3-continued

| Surface number | Surface type | Curvature radius | Thickness/ distance | Material Refractive index | Abbe number | Focal length | Conic coefficient |
|---|---|---|---|---|---|---|---|
| S19 | Aspheric | −2.2223 | 0.2100 | 1.65 | 20.7 | −3.46 | −1.0000 |
| S20 | Aspheric | −124.6192 | 0.0200 | | | | 0.0000 |
| S21 | Spherical | Infinite | 0.2100 | 1.52 | 64.2 | | |
| S22 | Spherical | Infinite | 0.6400 | | | | |
| S23 | Spherical | Infinite | | | | | |

TABLE 4

| Surface number | A4 | A6 | A8 | A10 | A12 | A14 | A16 |
|---|---|---|---|---|---|---|---|
| S1 | −1.1450E−02 | 2.0658E−02 | −1.7142E−02 | 7.2962E−03 | −1.6491E−03 | 1.8876E−04 | −8.6197E−06 |
| S2 | −3.2361E−02 | 2.3016E−02 | −1.2940E−02 | 4.5720E−03 | −9.6090E−04 | 1.0994E−04 | −5.2806E−06 |
| S3 | 3.0632E−02 | 2.9811E−03 | −8.7282E−03 | 3.4642E−03 | −6.0369E−04 | 4.5792E−05 | −9.8137E−07 |
| S4 | 6.9376E−02 | −2.9890E−02 | 1.2743E−02 | −5.8970E−03 | 1.8279E−03 | −3.0195E−04 | 2.0220E−05 |
| S5 | −3.2527E−02 | 9.9905E−04 | 3.0782E−03 | −2.3856E−03 | 9.2818E−04 | −1.7509E−04 | 1.2535E−05 |
| S6 | −4.3261E−02 | 1.5463E−02 | −1.2454E−02 | 6.7965E−03 | −2.0201E−03 | 3.3606E−04 | −2.4031E−05 |
| S7 | 6.1612E−03 | −5.3774E−03 | 3.2498E−03 | −3.0135E−03 | 1.3437E−03 | −2.6973E−04 | 2.1154E−05 |
| S8 | 2.6316E−03 | 1.4051E−03 | −5.6448E−04 | −8.1419E−04 | 5.5409E−04 | −1.3634E−04 | 1.3093E−05 |
| S9 | 2.6322E−03 | −1.6421E−02 | 4.3034E−03 | −2.7478E−03 | 1.4214E−03 | −3.0828E−04 | 2.5086E−05 |
| S10 | 2.7517E−03 | −1.4353E−02 | 5.0065E−03 | −2.0429E−03 | 6.8856E−04 | −1.1096E−04 | 6.9272E−06 |
| S11 | −3.6629E−02 | −2.8923E−03 | 1.0224E−02 | −4.3511E−03 | 7.0886E−04 | −2.9965E−05 | −1.6744E−06 |
| S12 | −4.9929E−02 | 5.6818E−03 | 3.0016E−03 | −1.3802E−03 | 1.4835E−04 | 7.5239E−06 | −1.3701E−06 |
| S13 | −9.3750E−03 | 3.3448E−03 | −1.4184E−04 | −7.4807E−05 | 1.4271E−05 | −1.0224E−06 | 2.6514E−08 |
| S14 | 3.3062E−03 | 2.3915E−03 | −4.9119E−04 | 6.4448E−05 | −3.4123E−06 | −1.0985E−07 | 1.2479E−08 |
| S15 | 1.8640E−02 | −1.0882E−02 | 3.5632E−03 | −6.9268E−04 | 7.5145E−05 | −4.2324E−06 | 9.7418E−08 |
| S16 | −1.6669E−02 | −3.9457E−03 | 2.5003E−03 | −4.7306E−04 | 4.4344E−05 | −2.0942E−06 | 3.9709E−08 |
| S17 | −2.2370E−02 | 3.0260E−03 | −2.9811E−04 | 2.1679E−05 | −1.0539E−06 | 2.9933E−08 | −3.7123E−10 |
| S18 | 1.4340E−02 | −2.8048E−03 | 3.2588E−04 | −2.4356E−05 | 1.1057E−06 | −2.7118E−08 | 2.7379E−10 |
| S19 | 1.8178E−02 | −1.0389E−03 | 6.1369E−05 | −8.0503E−06 | 7.2462E−07 | −2.9941E−08 | 4.5376E−10 |
| S20 | 2.2185E−03 | −4.0753E−04 | 2.6969E−05 | −1.0529E−06 | 2.3424E−08 | −2.6644E−10 | 1.1772E−12 |

Figure 4A:
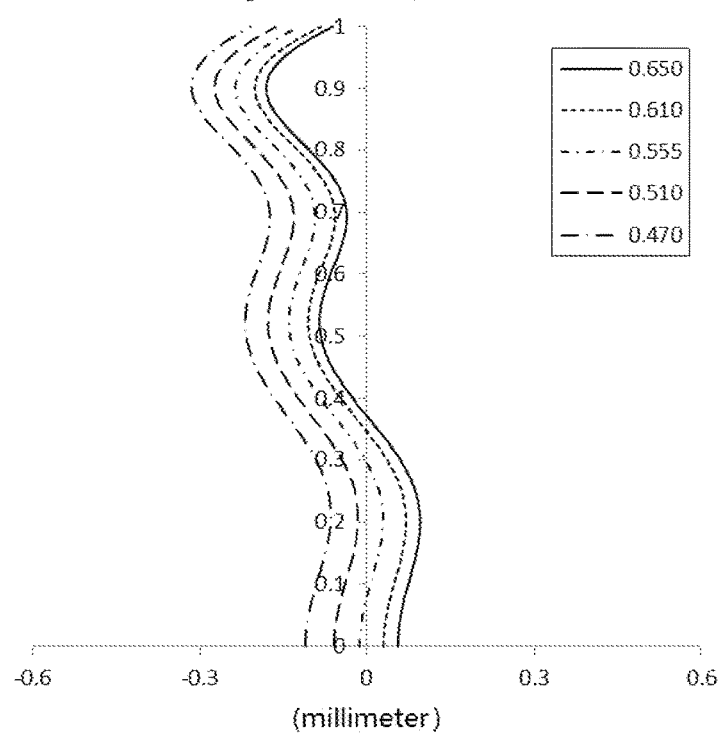
FIG. 4A to FIG. 4C show a longitudinal aberration curve, an astigmatism curve, and a distortion curve of an optical imaging lens assembly according to embodiment 2 respectively.
Figure 4B:
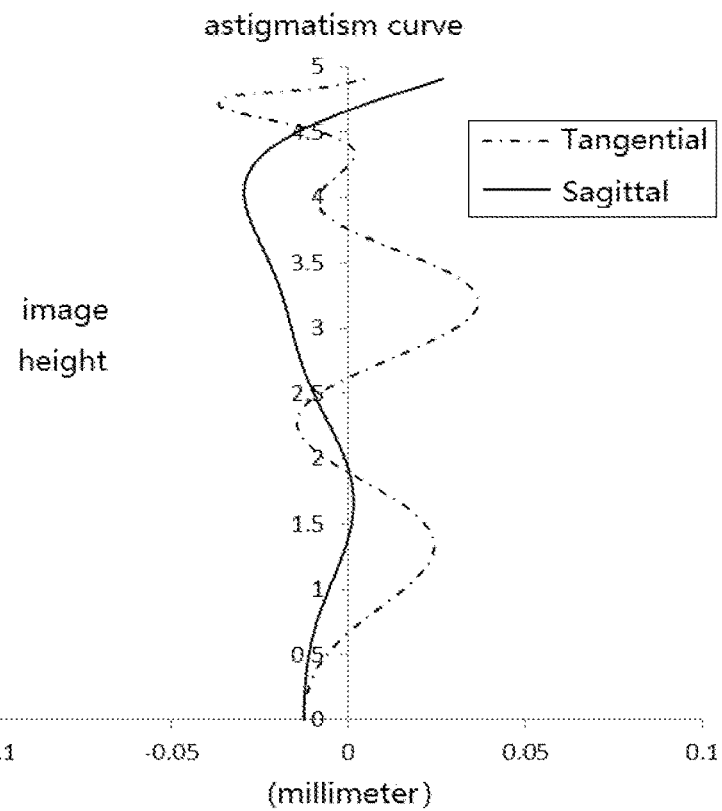
Figure 4C:
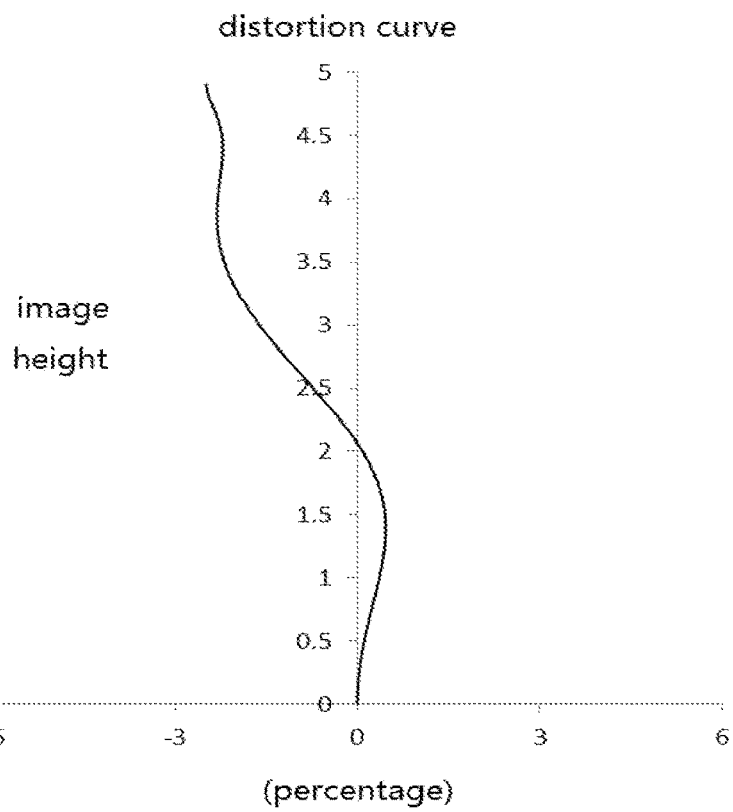

FIG. 4A shows a longitudinal aberration curve of the optical imaging lens assembly according to embodiment 2 to represent deviation of a convergence focal point after light with different wavelengths passes through the lens. FIG. 4B shows an astigmatism curve of the optical imaging lens assembly according to embodiment 2 to represent a meridian image surface curvature and a sagittal image surface curvature. FIG. 4C shows a distortion curve of the optical imaging lens assembly according to embodiment 2 to represent distortion values corresponding to different image heights. According to FIG. 4A to FIG. 4C, it can be seen that the optical imaging lens assembly provided in embodiment 2 may achieve high imaging quality.

Embodiment 3

Figure 5:
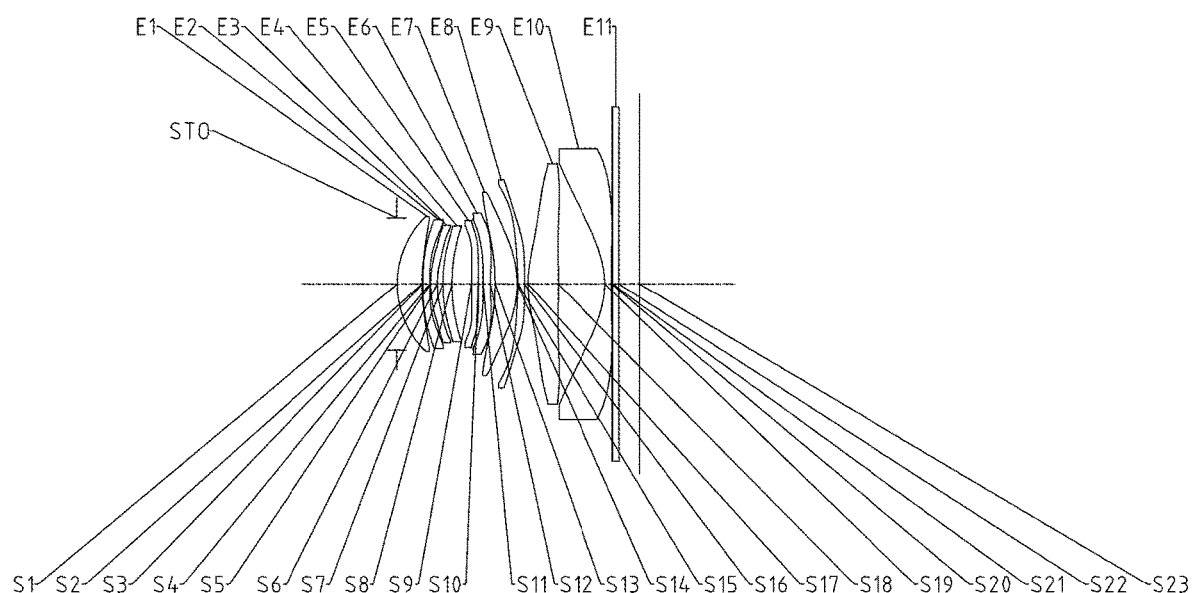
FIG. 5 is a structure diagram of an optical imaging lens assembly according to embodiment 3 of the disclosure.

An optical imaging lens assembly according to embodiment 3 of the disclosure will be described below with reference to FIG. 5 to FIG. 6C. FIG. 5 is a structure diagram of an optical imaging lens assembly according to embodiment 3 of the disclosure.

As shown in FIG. 5, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a negative refractive power, an object-side surface S15 thereof is a concave surface, while an image-side surface S16 is a convex surface. The ninth lens E9 has a positive refractive power, an object-side surface S17 thereof is a convex surface, while an image-side surface S18 is a convex surface. The tenth lens E10 has a negative refractive power, an object-side surface S19 thereof is a concave surface, while an image-side surface S20 is a concave surface. The optical filter E11 has an object-side surface S21 and an image-side surface S22. The optical imaging lens assembly has an imaging surface S23. Light from an object sequentially penetrates through each of the surfaces S1 to S22, and is finally imaged on the imaging surface S23.

In embodiment 3, a value of a total effective focal length f of the optical imaging lens assembly is 5.50 mm, a value of an on-axis distance TTL from the object-side surface S1 of the first lens E1 to the imaging surface S23 is 7.64 mm, and a value of ImgH is a half of a diagonal length of an effective pixel region on the imaging surface S23, ImgH is 4.71 mm.

Table 5 is a basic parameter table of the optical imaging lens assembly of embodiment 3, and units of the curvature radius, the thickness/distance and the focal length are all mm. Table 6 shows high-order coefficients applied to each aspheric mirror surface in embodiment 3. A surface type of each aspheric surface may be defined by the formula (1) given in embodiment 1.

shows an astigmatism curve of the optical imaging lens assembly according to embodiment 3 to represent a meridian image surface curvature and a sagittal image surface curvature. FIG. 6C shows a distortion curve of the optical imaging lens assembly according to embodiment 3 to represent distortion values corresponding to different image heights. According to FIG. 6A to FIG. 6C, it can be seen that the optical imaging lens assembly provided in embodiment 3 may achieve high imaging quality.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0200 | | | | |
| S1 | Aspheric | 3.0011 | 0.7801 | 1.55 | 51.8 | 10.26 | 0.0000 |
| S2 | Aspheric | 5.8100 | 0.0294 | | | | 0.0000 |
| S3 | Aspheric | 14.4314 | 0.2119 | 1.66 | 19.7 | 398.31 | 0.0000 |
| S4 | Aspheric | 15.1719 | 0.0249 | | | | 0.0000 |
| S5 | Aspheric | 2.9216 | 0.2118 | 1.64 | 21.6 | −405.89 | 0.0000 |
| S6 | Aspheric | 2.8073 | 0.1766 | | | | 0.0000 |
| S7 | Aspheric | 5.4444 | 0.2822 | 1.56 | 43.9 | −360.03 | 0.0000 |
| S8 | Aspheric | 5.2028 | 0.6200 | | | | 0.0000 |
| S9 | Aspheric | 21.5774 | 0.2113 | 1.67 | 19.0 | 32.11 | 0.0000 |
| S10 | Aspheric | 3379.4078 | 0.1512 | | | | 0.0000 |
| S11 | Aspheric | 173.7411 | 0.2338 | 1.59 | 28.5 | −14.17 | 0.0000 |
| S12 | Aspheric | 8.0209 | 0.1461 | | | | 0.0000 |
| S13 | Aspheric | −8.1221 | 0.6962 | 1.61 | 26.2 | 8.38 | 0.0000 |
| S14 | Aspheric | −3.2567 | 0.0200 | | | | −1.0000 |
| S15 | Aspheric | −9.9589 | 0.2100 | 1.57 | 34.3 | −20.20 | 0.0000 |
| S16 | Aspheric | −70.1470 | 0.1105 | | | | 0.0000 |
| S17 | Aspheric | 3.9114 | 0.9556 | 1.59 | 32.5 | 5.65 | −1.0000 |
| S18 | Aspheric | −20.0835 | 1.4748 | | | | 0.0000 |
| S19 | Aspheric | −2.7561 | 0.2100 | 1.67 | 19.0 | −3.77 | −1.0000 |
| S20 | Aspheric | 34.5940 | 0.0316 | | | | 0.0000 |
| S21 | Spherical | Infinite | 0.2100 | 1.52 | 64.2 | | |
| S22 | Spherical | Infinite | 0.6400 | | | | |
| S23 | Spherical | Infinite | | | | | |

TABLE 6

| Surface number | A4 | A6 | A8 | A10 | A12 | A14 | A16 |
|---|---|---|---|---|---|---|---|
| S1 | −1.5397E−02 | 2.8880E−02 | −2.1882E−02 | 8.2929E−03 | −1.6594E−03 | 1.6790E−04 | −6.7746E−06 |
| S2 | −2.6195E−02 | 1.7223E−02 | −9.7086E−03 | 3.5144E−03 | −7.5395E−04 | 8.7337E−05 | −4.2176E−06 |
| S3 | 2.6650E−02 | 6.8282E−03 | −1.0997E−02 | 4.3022E−03 | −7.9511E−04 | 7.0271E−05 | −2.3053E−06 |
| S4 | 7.8557E−02 | −4.1554E−02 | 2.1547E−02 | −9.5444E−03 | 2.6653E−03 | −4.0111E−04 | 2.4865E−05 |
| S5 | −3.1350E−02 | 1.6643E−03 | 1.1709E−03 | −1.1134E−03 | 5.4189E−04 | −1.1863E−04 | 9.3137E−06 |
| S6 | −3.8832E−02 | 7.9036E−03 | −5.6909E−03 | 3.6231E−03 | −1.2021E−03 | 2.2845E−04 | −1.8492E−05 |
| S7 | 2.5602E−02 | −3.1011E−02 | 2.3962E−02 | −1.2861E−02 | 4.0757E−03 | −6.7873E−04 | 4.6554E−05 |
| S8 | −2.0716E−02 | 3.1706E−02 | −2.4613E−02 | 1.0632E−02 | −2.6460E−03 | 3.4673E−04 | −1.7306E−05 |
| S9 | −2.4211E−03 | −1.2638E−02 | 2.4492E−03 | −1.9952E−03 | 1.1881E−03 | −2.6615E−04 | 2.1829E−05 |
| S10 | 7.2644E−02 | −1.7293E−02 | 6.2052E−03 | −2.4091E−03 | 7.7484E−04 | −1.2322E−04 | 7.6835E−06 |
| S11 | −3.7663E−02 | −2.6295E−03 | 1.0432E−02 | −4.4869E−03 | 7.3163E−04 | −2.9858E−05 | −1.8870E−06 |
| S12 | −4.9276E−02 | 5.4848E−03 | 2.8996E−03 | −1.3316E−03 | 1.4250E−04 | 7.4009E−06 | −1.3283E−06 |
| S13 | −1.0757E−02 | 3.8488E−03 | −1.9847E−04 | −7.9530E−05 | 1.6059E−05 | −1.1837E−06 | 3.1407E−08 |
| S14 | −9.1445E−04 | 3.6561E−03 | −1.2133E−03 | 2.4720E−04 | −2.8100E−05 | 1.5695E−06 | −3.3665E−08 |
| S15 | 1.7217E−02 | −9.9266E−03 | 3.1517E−03 | −5.9136E−04 | 6.1900E−05 | −3.3655E−06 | 7.4817E−08 |
| S16 | −1.6499E−02 | −3.8313E−03 | 2.4428E−03 | −4.6169E−04 | 4.3186E−05 | −2.0340E−06 | 3.8443E−08 |
| S17 | −2.1953E−02 | 2.9346E−03 | −2.8470E−04 | 2.0676E−05 | −1.0140E−06 | 2.9164E−08 | −3.6620E−10 |
| S18 | 1.3121E−02 | −2.5779E−03 | 2.9511E−04 | −2.1841E−05 | 9.8461E−07 | −2.3980E−08 | 2.4025E−10 |
| S19 | 1.5571E−02 | −3.0917E−03 | 5.5280E−04 | −6.0422E−05 | 3.7992E−06 | −1.2609E−07 | 1.6982E−09 |
| S20 | −2.0876E−03 | −9.0105E−05 | 1.2657E−05 | −6.9114E−07 | 1.6930E−08 | −1.2169E−10 | −7.6648E−13 |

Figure 6A:
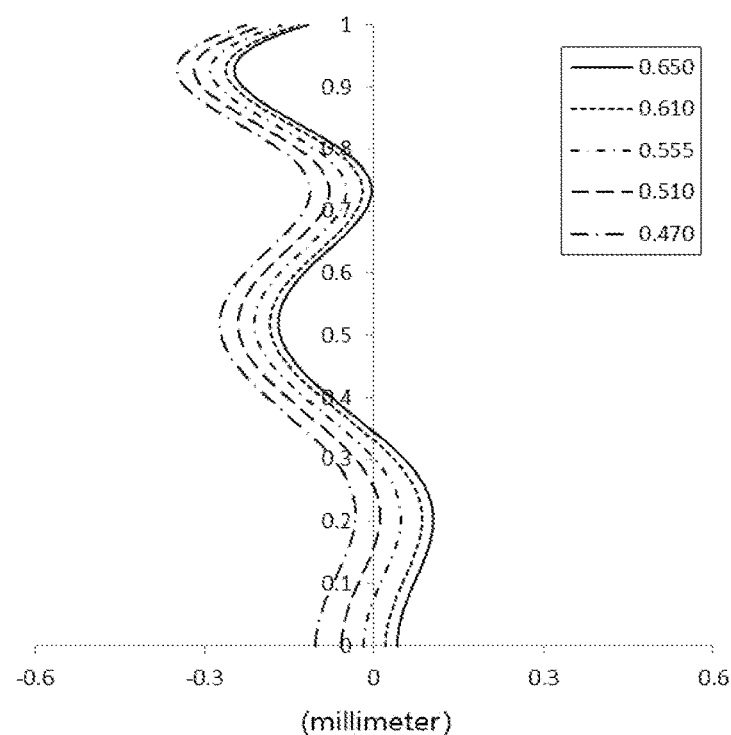
FIG. 6A to FIG. 6C show a longitudinal aberration curve, an astigmatism curve, and a distortion curve of an optical imaging lens assembly according to embodiment 3 respectively.
Figure 6B:
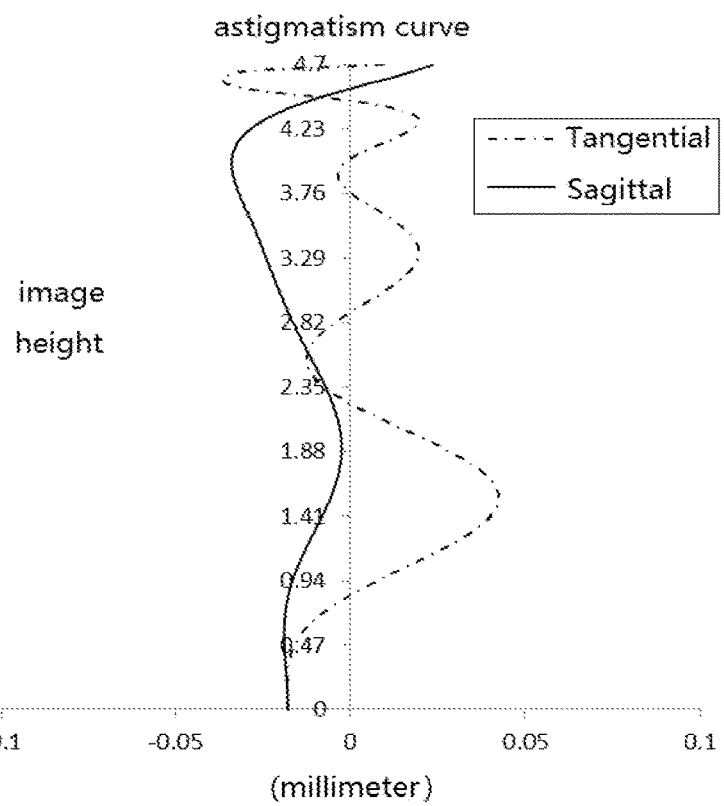
Figure 6C:
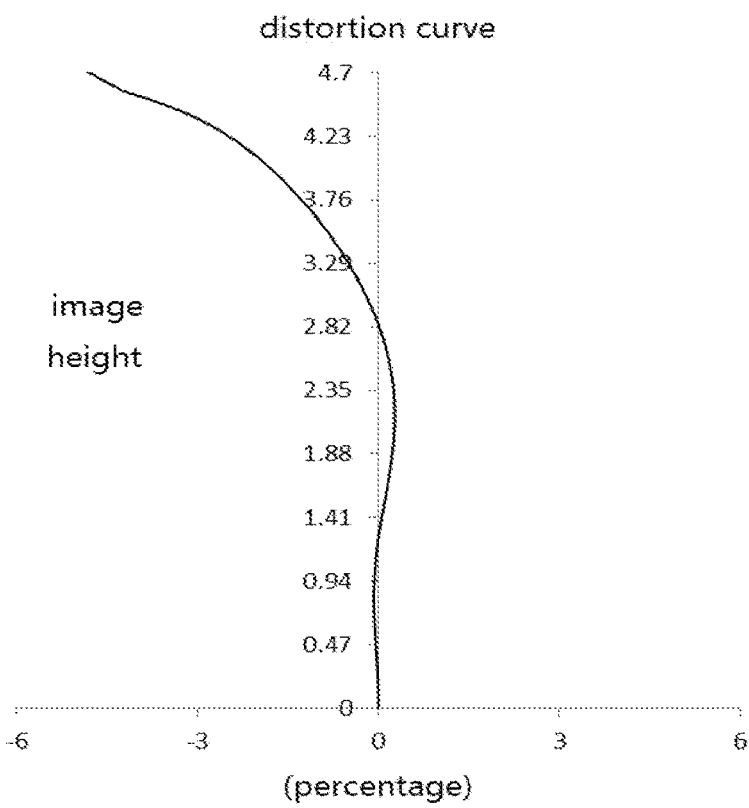

FIG. 6A shows a longitudinal aberration curve of the optical imaging lens assembly according to embodiment 3 to represent deviation of a convergence focal point after light with different wavelengths passes through the lens. FIG. 6B Embodiment 4

Figure 7:
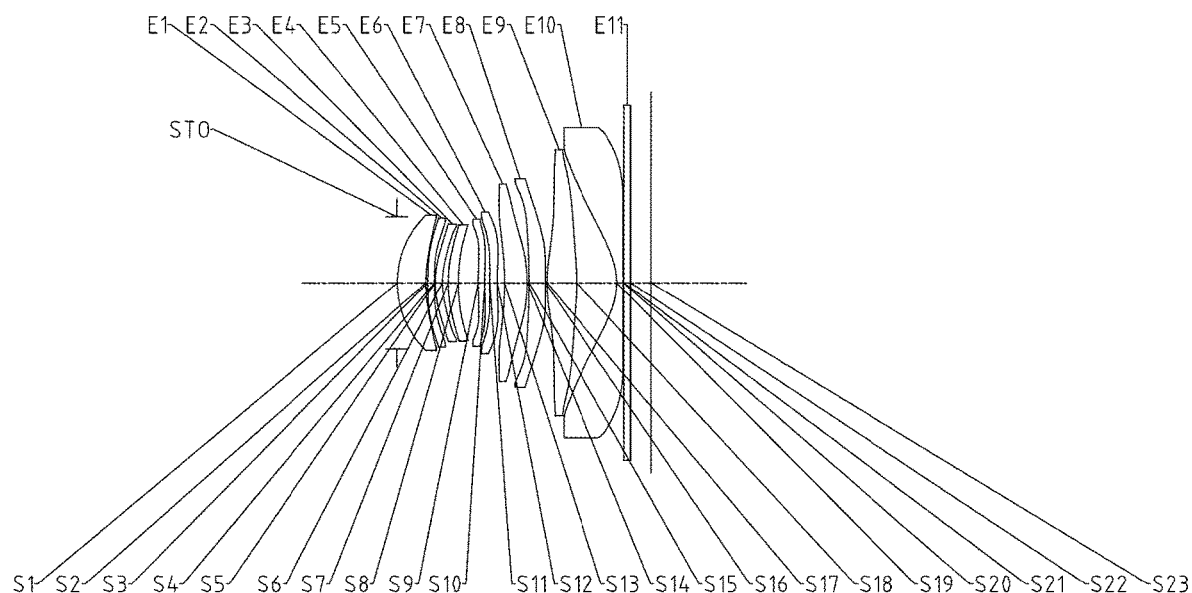
FIG. 7 is a structure diagram of an optical imaging lens assembly according to embodiment 4 of the disclosure.

An optical imaging lens assembly according to embodiment 4 of the disclosure will be described below with reference to FIG. 7 to FIG. 8C. FIG. 7 is a structure diagram of an optical imaging lens assembly according to embodiment 4 of the disclosure.

As shown in FIG. 7, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a negative refractive power, an object-side surface S15 thereof is a concave surface, while an image-side surface S16 is a convex surface. The ninth lens E9 has a positive refractive power, an object-side surface S17 thereof is a convex surface, while an image-side surface S18 is a convex surface. The tenth lens E10 has a negative refractive power, an object-side surface S19 thereof is a concave surface, while an image-side surface S20 is a convex surface. The optical filter E11 has an object-side surface S21 and an image-side surface S22. The optical imaging lens assembly has an imaging surface S23. Light from an object sequentially penetrates through each of the surfaces S1 to S22, and is finally imaged on the imaging surface S23.

In embodiment 4, a value of a total effective focal length f of the optical imaging lens assembly is 5.91 mm, a value of an on-axis distance TTL from the object-side surface S1 of the first lens E1 to the imaging surface S23 is 8.00 mm, and a value of ImgH is a half of a diagonal length of an effective pixel region on the imaging surface S23, ImgH is 5.26 mm.

Table 7 is a basic parameter table of the optical imaging lens assembly of embodiment 4, and units of the curvature radius, the thickness/distance and the focal length are all mm. Table 8 shows high-order coefficients applied to each aspheric mirror surface in embodiment 4. A surface type of each aspheric surface may be defined by the formula (1) given in embodiment 1.

TABLE 7

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | 0.0200 | | | | |
| S1 | Aspheric | 2.9684 | 0.9035 | 1.54 | 56.0 | 13.97 | 0.0000 |
| S2 | Aspheric | 4.3348 | 0.0563 | | | | 0.0000 |
| S3 | Aspheric | 13.5292 | 0.2100 | 1.67 | 19.2 | 47.90 | 0.0000 |
| S4 | Aspheric | 23.1506 | 0.0235 | | | | 0.0000 |
| S5 | Aspheric | 2.7955 | 0.2265 | 1.67 | 19.0 | −151.43 | 0.0000 |
| S6 | Aspheric | 2.6323 | 0.1872 | | | | 0.0000 |
| S7 | Aspheric | 4.6176 | 0.3194 | 1.57 | 37.3 | 31.12 | 0.0000 |
| S8 | Aspheric | 6.0662 | 0.6209 | | | | 0.0000 |
| S9 | Aspheric | 14.9448 | 0.2100 | 1.67 | 19.0 | 37.32 | 0.0000 |
| S10 | Aspheric | 36.4246 | 0.1520 | | | | 0.0000 |
| S11 | Aspheric | 34.5030 | 0.2375 | 1.54 | 56.0 | −16.15 | 0.0000 |
| S12 | Aspheric | 7.0114 | 0.2298 | | | | 0.0000 |
| S13 | Aspheric | −11.8331 | 0.7127 | 1.54 | 56.0 | 12.54 | 0.0000 |
| S14 | Aspheric | −4.4328 | 0.0615 | | | | 0.0000 |
| S15 | Aspheric | −14.2312 | 0.5145 | 1.58 | 36.1 | −28.40 | 0.0000 |
| S16 | Aspheric | −108.3100 | 0.0485 | | | | 0.0000 |
| S17 | Aspheric | 4.7824 | 0.9367 | 1.59 | 31.1 | 5.34 | 0.0000 |
| S18 | Aspheric | −8.7109 | 1.2723 | | | | 0.0000 |
| S19 | Aspheric | −2.0957 | 0.2100 | 1.62 | 23.8 | −3.45 | −1.0000 |
| S20 | Aspheric | −85.3418 | 0.0200 | | | | 0.0000 |
| S21 | Spherical | Infinite | 0.2100 | 1.52 | 64.2 | | |
| S22 | Spherical | Infinite | 0.6400 | | | | |
| S23 | Spherical | Infinite | | | | | |

TABLE 8

| Surface number | A4 | A6 | A8 | A10 | A12 |
|---|---|---|---|---|---|
| S1 | −2.9690E−03 | 2.3923E−03 | −1.7144E−03 | 8.1485E−04 | −2.0873E−04 |
| S2 | −3.9044E−02 | 3.0469E−02 | −1.8743E−02 | 7.1417E−03 | −1.5823E−03 |
| S3 | 2.0813E−02 | 1.0930E−02 | −1.2427E−02 | 4.5772E−03 | −8.2904E−04 |
| S4 | 6.7361E−02 | −2.9791E−02 | 1.2594E−02 | −5.3562E−03 | 1.5050E−03 |
| S5 | −3.0776E−02 | −3.0227E−03 | 6.4318E−03 | −4.0297E−03 | 1.3780E−03 |
| S6 | −5.0644E−02 | 2.0092E−02 | −1.3029E−02 | 5.6806E−03 | −1.3246E−03 |

TABLE 8-continued

| | | | | | |
|---|---|---|---|---|---|
| S7 | 6.4406E−03 | −6.0168E−03 | 3.6896E−03 | −3.1565E−03 | 1.3619E−03 |
| S8 | 4.4528E−03 | −1.6828E−03 | 2.2685E−03 | −2.2634E−03 | 9.7750E−04 |
| S9 | −2.5696E−03 | −1.4805E−02 | 4.6905E−03 | −3.1668E−03 | 1.5283E−03 |
| S10 | 6.6890E−03 | −1.5490E−02 | 4.7913E−03 | −1.7330E−03 | 5.8584E−04 |
| S11 | −3.6556E−02 | −4.5802E−03 | 1.2530E−02 | −5.5126E−03 | 9.7600E−04 |
| S12 | −5.2471E−02 | 6.6108E−03 | 2.3795E−03 | −1.1530E−03 | 1.1146E−04 |
| S13 | −8.4104E−03 | 3.5282E−03 | −1.7209E−04 | −8.3055E−05 | 1.6687E−05 |
| S14 | 1.5549E−03 | 2.9638E−03 | −8.8804E−04 | 1.6681E−04 | −1.7454E−05 |
| S15 | 1.8385E−02 | −1.0284E−02 | 3.2620E−03 | −6.1647E−04 | 6.4673E−05 |
| S16 | −1.6865E−02 | −3.7947E−03 | 2.3850E−03 | −4.4073E−04 | 3.9875E−05 |
| S17 | −2.3075E−02 | 2.9207E−03 | −2.9762E−04 | 2.2366E−05 | −1.1395E−06 |
| S18 | 1.3750E−02 | −2.6660E−03 | 3.2816E−04 | −2.6775E−05 | 1.3863E−06 |
| S19 | 2.3965E−02 | −2.8192E−03 | 3.1854E−04 | −2.8630E−05 | 1.7944E−06 |
| S20 | 1.7434E−04 | 5.9021E−04 | −1.3262E−04 | 1.2191E−05 | −6.2988E−07 |

| Surface number | A14 | A16 | A18 | A20 |
|---|---|---|---|---|
| S1 | 2.6654E−05 | −1.3404E−06 | 0.0000E+00 | 0.0000E+00 |
| S2 | 1.8399E−04 | −8.0057E−06 | −1.1120E−07 | 0.0000E+00 |
| S3 | 7.3720E−05 | −2.5295E−06 | 0.0000E+00 | 0.0000E+00 |
| S4 | −2.2239E−04 | 1.1894E−05 | 2.5116E−07 | 0.0000E+00 |
| S5 | −2.2931E−04 | 1.1758E−05 | 5.3090E−07 | 0.0000E+00 |
| S6 | 1.6488E−04 | −6.1139E−06 | −5.0565E−07 | 0.0000E+00 |
| S7 | −2.6922E−04 | 2.0933E−05 | 0.0000E+00 | 0.0000E+00 |
| S8 | −2.0199E−04 | 1.7265E−05 | 0.0000E+00 | 0.0000E+00 |
| S9 | −3.1494E−04 | 2.3850E−05 | 1.3876E−07 | 0.0000E+00 |
| S10 | −9.5528E−05 | 5.9529E−06 | 1.1096E−08 | 0.0000E+00 |
| S11 | −5.6828E−05 | −7.7498E−07 | −1.0532E−08 | 0.0000E+00 |
| S12 | 9.3013E−06 | −1.2578E−06 | −9.0101E−09 | 0.0000E+00 |
| S13 | −1.2406E−06 | 3.3104E−08 | 1.1972E−11 | 0.0000E+00 |
| S14 | 8.6335E−07 | −1.2824E−08 | −1.7717E−10 | 0.0000E+00 |
| S15 | −3.4593E−06 | 6.9932E−08 | 3.1675E−10 | 0.0000E+00 |
| S16 | −1.7658E−06 | 2.7950E−08 | 1.1527E−10 | 2.3291E−12 |
| S17 | 3.3745E−08 | −3.9072E−10 | −2.5235E−12 | 0.0000E+00 |
| S18 | −4.1545E−08 | 5.6233E−10 | 0.0000E+00 | 0.0000E+00 |
| S19 | −7.7510E−08 | 2.6708E−09 | −7.8491E−11 | 1.2659E−12 |
| S20 | 1.7858E−08 | −2.0952E−10 | −1.7385E−13 | 0.0000E+00 |

Figure 8A:
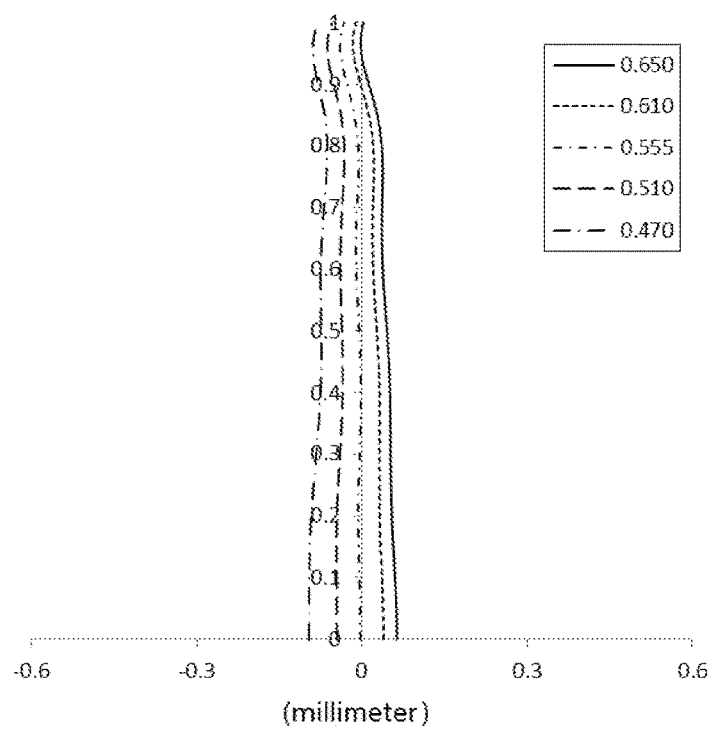
FIG. 8A to FIG. 8C show a longitudinal aberration curve, an astigmatism curve, and a distortion curve of an optical imaging lens assembly according to embodiment 4 respectively.
Figure 8B:
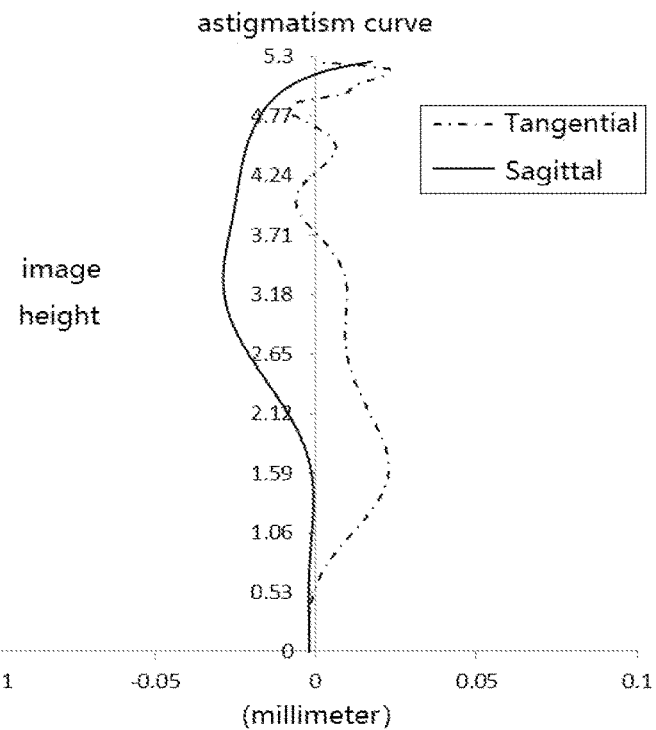
Figure 8C:
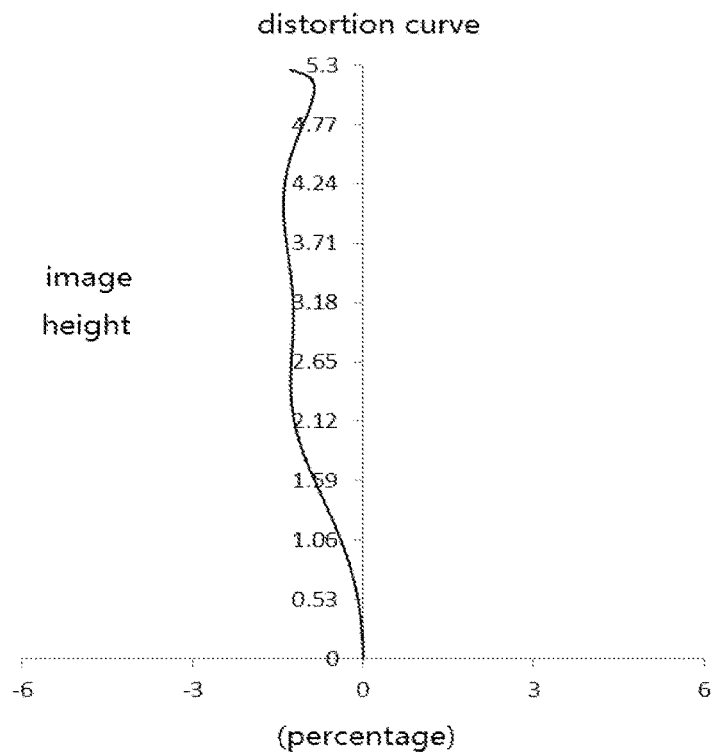

FIG. 8A shows a longitudinal aberration curve of the optical imaging lens assembly according to embodiment 4 to represent deviation of a convergence focal point after light with different wavelengths passes through the lens. FIG. 8B shows an astigmatism curve of the optical imaging lens assembly according to embodiment 4 to represent a meridian image surface curvature and a sagittal image surface curvature. FIG. 8C shows a distortion curve of the optical imaging lens assembly according to embodiment 4 to represent distortion values corresponding to different image heights. According to FIG. 8A to FIG. 8C, it can be seen that the optical imaging lens assembly provided in embodiment 4 may achieve high imaging quality.

Embodiment 5

Figure 9:
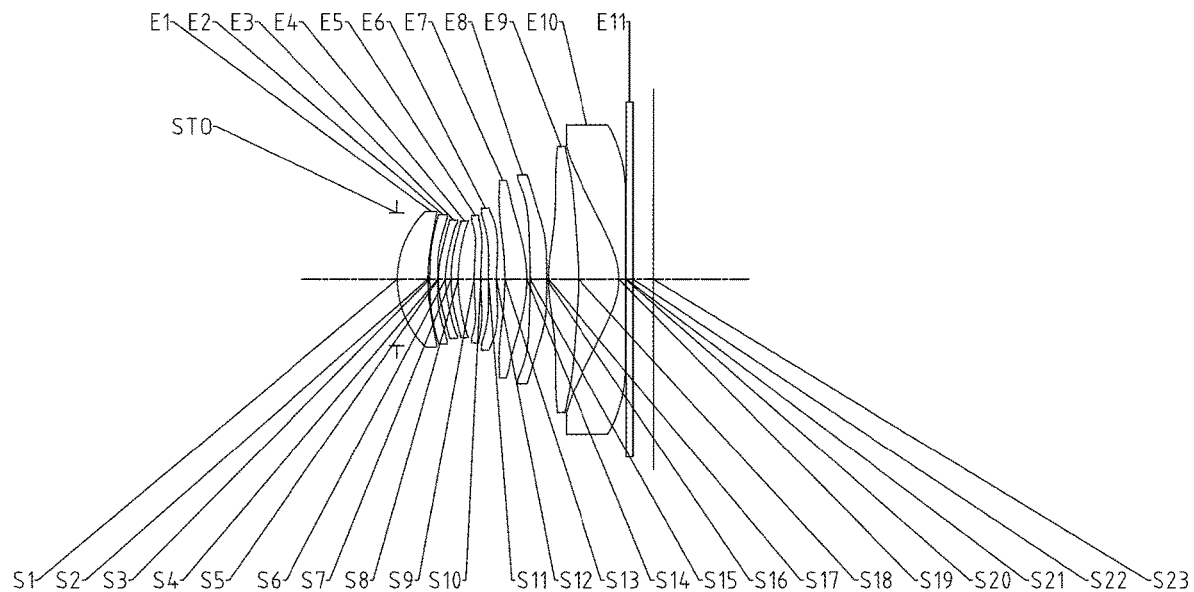
FIG. 9 is a structure diagram of an optical imaging lens assembly according to embodiment 5 of the disclosure.

An optical imaging lens assembly according to embodiment 5 of the disclosure will be described below with reference to FIG. 9 to FIG. 10C. FIG. 9 is a structure diagram of an optical imaging lens assembly according to embodiment 5 of the disclosure.

As shown in FIG. 9, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a negative refractive power, an object-side surface S15 thereof is a concave surface, while an image-side surface S16 is a convex surface. The ninth lens E9 has a positive refractive power, an object-side surface S17 thereof is a convex surface, while an image-side surface S18 is a convex surface. The tenth lens E10 has a negative refractive power, an object-side surface S19 thereof is a concave surface, while an image-side surface S20 is a convex surface. The optical filter E11 has an object-side surface S21 and an image-side surface S22. The optical imaging lens assembly has an imaging surface S23. Light from an object sequentially penetrates through each of the surfaces S1 to S22, and is finally imaged on the imaging surface S23.

In embodiment 5, a value of a total effective focal length f of the optical imaging lens assembly is 5.98 mm, a value of an on-axis distance TTL from the object-side surface S1 of the first lens E1 to the imaging surface S23 is 8.07 mm, and a value of ImgH is a half of a diagonal length of an effective pixel region on the imaging surface S23, ImgH is 5.34 mm.

Table 9 is a basic parameter table of the optical imaging lens assembly of embodiment 5, and units of the curvature radius, the thickness/distance and the focal length are all mm. Table 10 shows high-order coefficients applied to each aspheric mirror surface in embodiment 5. A surface type of each aspheric surface may be defined by the formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0200 | | | | |
| S1 | Aspheric | 3.0088 | 0.9638 | 1.54 | 56.0 | 12.30 | 0.0000 |
| S2 | Aspheric | 4.8309 | 0.0595 | | | | 0.0000 |
| S3 | Aspheric | 22.4775 | 0.2477 | 1.67 | 19.0 | 38.76 | 0.0000 |
| S4 | Aspheric | 157.0791 | 0.0200 | | | | 0.0000 |
| S5 | Aspheric | 3.0625 | 0.2203 | 1.67 | 19.0 | −201.28 | 0.0000 |
| S6 | Aspheric | 2.9082 | 0.1840 | | | | 0.0000 |
| S7 | Aspheric | 5.4099 | 0.2199 | 1.54 | 56.0 | −1432.50 | 0.0000 |
| S8 | Aspheric | 5.2956 | 0.5019 | | | | 0.0000 |
| S9 | Aspheric | 8.2829 | 0.2124 | 1.67 | 19.0 | 26.98 | 0.0000 |
| S10 | Aspheric | 15.0089 | 0.2453 | | | | 0.0000 |
| S11 | Aspheric | 22.3839 | 0.2461 | 1.55 | 55.0 | −16.83 | 0.0000 |
| S12 | Aspheric | 6.5021 | 0.2620 | | | | 0.0000 |
| S13 | Aspheric | −12.1024 | 0.6946 | 1.57 | 39.5 | 12.40 | 0.0000 |
| S14 | Aspheric | −4.5554 | 0.1037 | | | | 0.0000 |
| S15 | Aspheric | −16.2423 | 0.5194 | 1.58 | 35.8 | −30.10 | 0.0000 |
| S16 | Aspheric | −243.6206 | 0.0592 | | | | 0.0000 |
| S17 | Aspheric | 4.8142 | 0.9494 | 1.59 | 31.6 | 5.48 | 0.0000 |
| S18 | Aspheric | −9.1965 | 1.2839 | | | | 0.0000 |
| S19 | Aspheric | −2.1074 | 0.2100 | 1.62 | 23.3 | −3.42 | −1.0000 |
| S20 | Aspheric | −120.4988 | 0.0200 | | | | 0.0000 |
| S21 | Spherical | Infinite | 0.2100 | 1.52 | 64.2 | | |
| S22 | Spherical | Infinite | 0.6400 | | | | |
| S23 | Spherical | Infinite | | | | | |

TABLE 10

| Surface number | A4 | A6 | A8 | A10 | A12 |
|---|---|---|---|---|---|
| S1 | −3.4347E−03 | 2.9217E−03 | −2.1992E−03 | 1.1060E−03 | −2.9619E−04 |
| S2 | −3.9520E−02 | 3.1457E−02 | −1.9175E−02 | 7.2969E−03 | −1.6318E−03 |
| S3 | 2.1010E−02 | 1.0433E−02 | −1.2285E−02 | 4.5038E−03 | −7.9123E−04 |
| S4 | 7.4170E−02 | −3.4602E−02 | 1.4944E−02 | −6.2203E−03 | 1.7304E−03 |
| S5 | −2.7940E−02 | −5.7277E−03 | 8.2622E−03 | −4.5491E−03 | 1.4245E−03 |
| S6 | −4.6980E−02 | 1.7425E−02 | −1.1247E−02 | 5.0868E−03 | −1.2166E−03 |
| S7 | 1.4629E−02 | −9.7462E−03 | 5.0037E−03 | −3.4349E−03 | 1.3874E−03 |
| S8 | −1.5611E−03 | 2.3094E−03 | −7.4879E−04 | −6.7195E−04 | 4.8329E−04 |
| S9 | −3.4744E−03 | −1.4287E−02 | 4.2558E−03 | −2.8628E−03 | 1.4231E−03 |
| S10 | 7.0943E−02 | −1.5846E−02 | 5.0586E−03 | −1.8536E−03 | 6.1957E−04 |
| S11 | −3.7374E−02 | −4.3704E−03 | 1.2510E−02 | −5.5147E−03 | 9.7707E−04 |
| S12 | −5.1877E−02 | 6.7251E−03 | 2.2682E−03 | −1.1222E−03 | 1.0716E−04 |
| S13 | −8.9733E−03 | 3.6796E−03 | −1.9534E−04 | −8.1314E−05 | 1.6673E−05 |
| S14 | 1.4039E−03 | 2.6980E−03 | −7.8221E−04 | 1.4186E−04 | −1.4336E−05 |
| S15 | 1.8127E−02 | −1.0135E−02 | 3.1980E−03 | −6.0072E−04 | 6.2743E−05 |
| S16 | −1.7068E−02 | −3.7611E−03 | 2.4047E−03 | −4.4775E−04 | 4.0806E−05 |
| S17 | −2.2931E−02 | 2.8749E−03 | −2.8552E−04 | 2.0636E−05 | −9.9245E−07 |
| S18 | 1.3543E−02 | −2.5899E−03 | 3.0741E−04 | −2.3720E−05 | 1.1276E−06 |
| S19 | 2.3935E−02 | −2.7399E−03 | 2.8905E−04 | −2.3280E−05 | 1.1873E−06 |
| S20 | −6.5318E−04 | 7.6293E−04 | −1.4468E−04 | 1.2004E−05 | −5.5532E−07 |

| Surface number | A14 | A16 | A18 | A20 |
|---|---|---|---|---|
| S1 | 3.8773E−05 | −1.9450E−06 | 0.0000E+00 | 0.0000E+00 |
| S2 | 1.9375E−04 | −8.9109E−06 | −8.3341E−08 | 0.0000E+00 |
| S3 | 6.5405E−05 | −1.9037E−06 | 0.0000E+00 | 0.0000E+00 |
| S4 | −2.5867E−04 | 1.4708E−05 | 2.0570E−07 | 0.0000E+00 |
| S5 | −2.2614E−04 | 1.2201E−05 | 3.3605E−07 | 0.0000E+00 |
| S6 | 1.5947E−04 | −7.2766E−06 | −3.8395E−07 | 0.0000E+00 |
| S7 | −2.6758E−04 | 2.0519E−05 | 0.0000E+00 | 0.0000E+00 |
| S8 | −1.2022E−04 | 1.1602E−05 | 0.0000E+00 | 0.0000E+00 |
| S9 | −2.9942E−04 | 2.3540E−05 | 3.5003E−08 | 0.0000E+00 |
| S10 | −1.0103E−04 | 6.4053E−06 | −2.3218E−09 | 0.0000E+00 |
| S11 | −5.6898E−05 | −7.9733E−07 | −8.1406E−09 | 0.0000E+00 |

TABLE 10-continued

| | | | | |
|---|---|---|---|---|
| S12 | 9.7601E−06 | −1.3061E−06 | −6.4109E−09 | 0.0000E+00 |
| S13 | −1.2465E−06 | 3.3351E−08 | 1.2438E−11 | 0.0000E+00 |
| S14 | 6.8584E−07 | −9.9049E−09 | −1.2958E−10 | 0.0000E+00 |
| S15 | −3.3543E−06 | 6.8896E−08 | 2.4363E−10 | 0.0000E+00 |
| S16 | −1.8236E−06 | 2.9353E−08 | 1.1948E−10 | 1.9627E−12 |
| S17 | 2.6899E−08 | −2.6243E−10 | −2.1994E−12 | 0.0000E+00 |
| S18 | −2.9762E−08 | 3.3989E−10 | 0.0000E+00 | 0.0000E+00 |
| S19 | −3.3490E−08 | 5.5449E−10 | −1.1389E−11 | 2.0547E−13 |
| S20 | 1.4140E−08 | −1.5158E−10 | −1.0481E−13 | 0.0000E+00 |

Figure 10A:
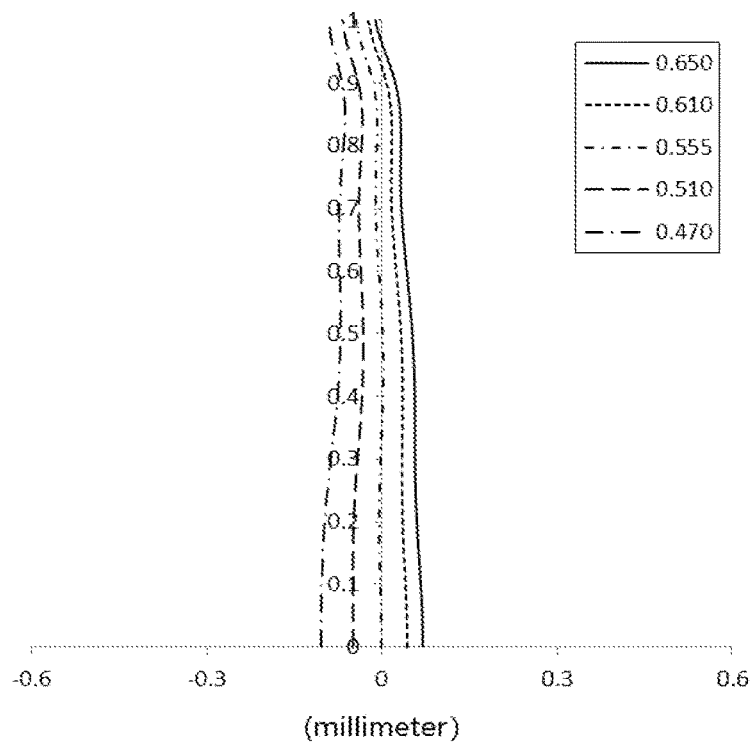
FIG. 10A to FIG. 10C show a longitudinal aberration curve, an astigmatism curve, and a distortion curve of an optical imaging lens assembly according to embodiment 5 respectively.
Figure 10B:
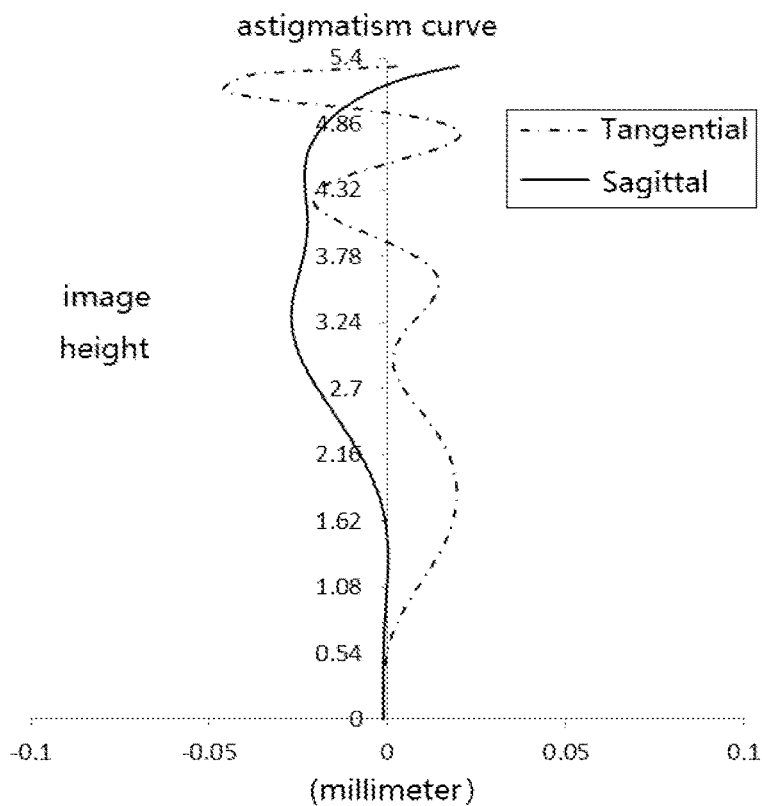
Figure 10C:
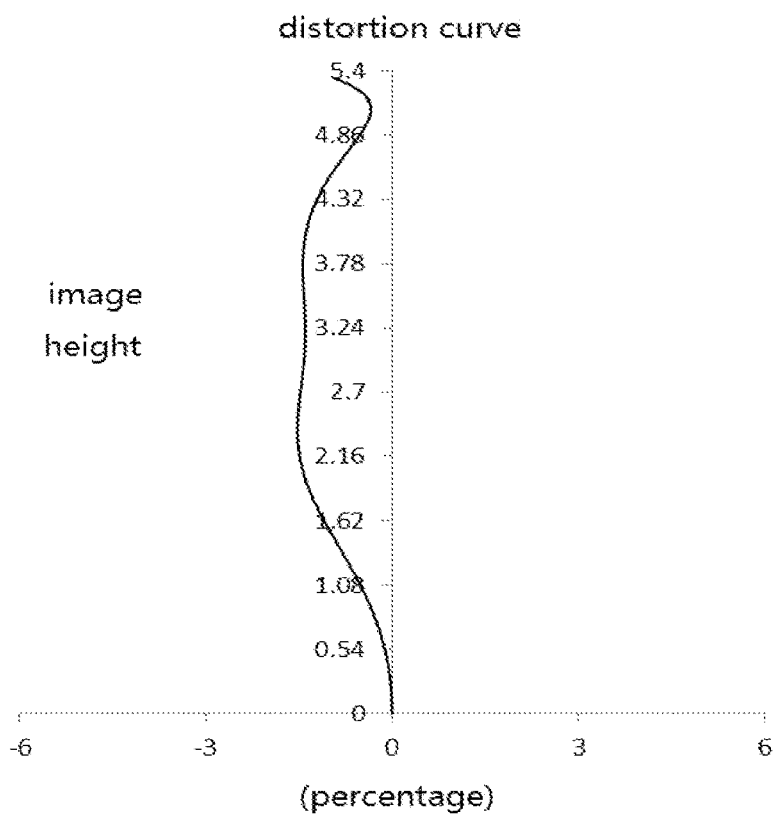

FIG. 10A shows a longitudinal aberration curve of the optical imaging lens assembly according to embodiment 5 to represent deviation of a convergence focal point after light with different wavelengths passes through the lens. FIG. 10B shows an astigmatism curve of the optical imaging lens assembly according to embodiment 5 to represent a meridian image surface curvature and a sagittal image surface curvature. FIG. 10C shows a distortion curve of the optical imaging lens assembly according to embodiment 5 to represent distortion values corresponding to different image heights. According to FIG. 10A to FIG. 10C, it can be seen that the optical imaging lens assembly provided in embodiment 5 may achieve high imaging quality.

Embodiment 6

Figure 11:
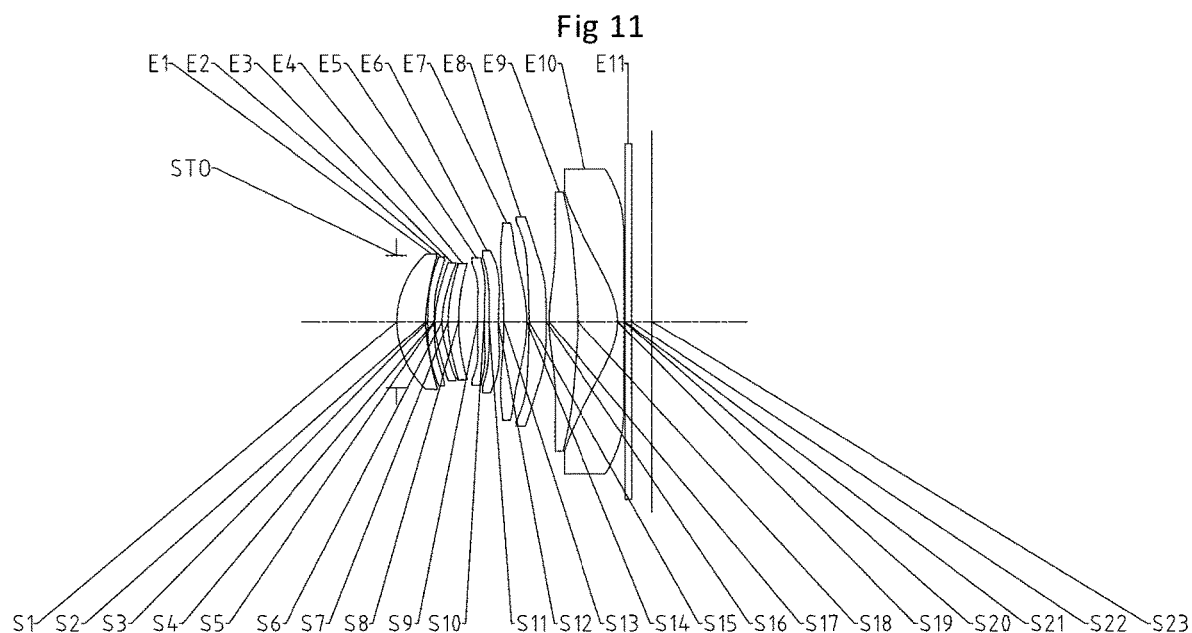
FIG. 11 is a structure diagram of an optical imaging lens assembly according to embodiment 6 of the disclosure.

An optical imaging lens assembly according to embodiment 6 of the disclosure will be described below with reference to FIG. 11 to FIG. 12C. FIG. 11 is a structure diagram of an optical imaging lens assembly according to embodiment 6 of the disclosure.

As shown in FIG. 11, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a negative refractive power, an object-side surface S15 thereof is a concave surface, while an image-side surface S16 is a convex surface. The ninth lens E9 has a positive refractive power, an object-side surface S17 thereof is a convex surface, while an image-side surface S18 is a convex surface. The tenth lens E10 has a negative refractive power, an object-side surface S19 thereof is a concave surface, while an image-side surface S20 is a convex surface. The optical filter E11 has an object-side surface S21 and an image-side surface S22. The optical imaging lens assembly has an imaging surface S23. Light from an object sequentially penetrates through each of the surfaces S1 to S22, and is finally imaged on the imaging surface S23.

In embodiment 6, a value of a total effective focal length f of the optical imaging lens assembly is 5.95 mm, a value of an on-axis distance TTL from the object-side surface S1 of the first lens E1 to the imaging surface S23 is 8.04 mm, and a value of ImgH is a half of a diagonal length of an effective pixel region on the imaging surface S23, ImgH is 5.35 mm.

Table 11 is a basic parameter table of the optical imaging lens assembly of embodiment 6, and units of the curvature radius, the thickness/distance and the focal length are all mm. Table 12 shows high-order coefficients applied to each aspheric mirror surface in embodiment 6. A surface type of each aspheric surface may be defined by the formula (1) aiven in embodiment 1.

TABLE 11

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| STO | Spherical | Infinite | 0.0200 | | | | |
| S1 | Aspheric | 2.9540 | 0.9045 | 1.54 | 56.0 | 14.82 | 0.0000 |
| S2 | Aspheric | 4.1466 | 0.0603 | | | | 0.0000 |
| S3 | Aspheric | 13.1348 | 0.2100 | 1.67 | 19.3 | 35.24 | 0.0000 |
| S4 | Aspheric | 29.2402 | 0.0208 | | | | 0.0000 |
| S5 | Aspheric | 2.8088 | 0.2282 | 1.67 | 19.0 | −138.00 | 0.0000 |
| S6 | Aspheric | 2.6374 | 0.1887 | | | | 0.0000 |
| S7 | Aspheric | 4.8406 | 0.3286 | 1.56 | 44.5 | 28.78 | 0.0000 |
| S8 | Aspheric | 6.7461 | 0.5950 | | | | 0.0000 |
| S9 | Aspheric | 17.7479 | 0.2100 | 1.67 | 19.0 | −299.99 | 0.0000 |
| S10 | Aspheric | 16.2424 | 0.1520 | | | | 0.0000 |

TABLE 11-continued

| Surface number | Surface type | Curvature radius | Thickness/ distance | Material Refractive index | Abbe number | Focal length | Conic coefficient |
|---|---|---|---|---|---|---|---|
| S11 | Aspheric | 15.8223 | 0.2964 | 1.54 | 56.0 | −21.82 | 0.0000 |
| S12 | Aspheric | 6.7550 | 0.1678 | | | | 0.0000 |
| S13 | Aspheric | −19.5453 | 0.7259 | 1.56 | 41.9 | 11.50 | 0.0000 |
| S14 | Aspheric | −4.9438 | 0.0697 | | | | 0.0000 |
| S15 | Aspheric | −15.3286 | 0.5394 | 1.58 | 35.2 | −32.42 | 0.0000 |
| S16 | Aspheric | −83.7314 | 0.0923 | | | | 0.0000 |
| S17 | Aspheric | 4.9344 | 0.9119 | 1.59 | 31.4 | 5.40 | 0.0000 |
| S18 | Aspheric | −8.4646 | 1.2620 | | | | 0.0000 |
| S19 | Aspheric | −2.0385 | 0.2100 | 1.60 | 25.9 | −3.38 | −1.0000 |
| S20 | Aspheric | −236.1829 | 0.0200 | | | | 0.0000 |
| S21 | Spherical | Infinite | 0.2100 | 1.52 | 64.2 | | |
| S22 | Spherical | Infinite | 0.6400 | | | | |
| S23 | Spherical | Infinite | | | | | |

TABLE 12

| Surface number | A4 | A6 | A8 | A10 | A12 |
|---|---|---|---|---|---|
| S1 | −2.6040E−03 | 1.4574E−03 | −9.2270E−04 | 4.7691E−04 | −1.2577E−04 |
| S2 | −3.8443E−02 | 2.9379E−02 | −1.8045E−02 | 6.8838E−03 | −1.5250E−03 |
| S3 | 2.0157E−02 | 1.1509E−02 | −1.2837E−02 | 4.7413E−03 | −8.6462E−04 |
| S4 | 6.8023E−02 | −3.0542E−02 | 1.3013E−02 | −5.5492E−03 | 1.5692E−03 |
| S5 | −2.9305E−02 | −5.4539E−03 | 8.2629E−03 | −4.7595E−03 | 1.5309E−03 |
| S6 | −5.1061E−02 | 2.0140E−02 | −1.2876E−02 | 5.6032E−03 | −1.3198E−03 |
| S7 | 5.9209E−03 | −3.0068E−03 | 7.0436E−04 | −1.7037E−03 | 9.7902E−04 |
| S8 | 5.8028E−03 | −1.1575E−03 | 4.6734E−04 | −1.0047E−03 | 5.5796E−04 |
| S9 | 2.7648E−04 | −1.6270E−02 | 5.1062E−03 | −3.3286E−03 | 1.6090E−03 |
| S10 | 3.7243E−03 | −1.4356E−02 | 4.6563E−03 | −1.7216E−03 | 5.6879E−04 |
| S11 | −3.8979E−02 | −3.8505E−03 | 1.2699E−02 | −5.7650E−03 | 1.0582E−03 |
| S12 | −5.0650E−02 | 5.8748E−03 | 2.4368E−03 | −1.0881E−03 | 9.3558E−05 |
| S13 | −9.0886E−03 | 3.8682E−03 | −3.2817E−04 | −4.6131E−05 | 1.2027E−05 |
| S14 | 1.5784E−03 | 3.2094E−03 | −1.0135E−03 | 2.0092E−04 | −2.2421E−05 |
| S15 | 1.8677E−02 | −1.0425E−02 | 3.3419E−03 | −6.3979E−04 | 6.8043E−05 |
| S16 | −1.6797E−02 | −3.7582E−03 | 2.3643E−03 | −4.3604E−04 | 3.9345E−05 |
| S17 | −2.3266E−02 | 3.0300E−03 | −3.2089E−04 | 2.5753E−05 | −1.4363E−06 |
| S18 | 1.3792E−02 | −2.6608E−03 | 3.2639E−04 | −2.6659E−05 | 1.3887E−06 |
| S19 | 2.3408E−02 | −2.5437E−03 | 2.6716E−04 | −2.3184E−05 | 1.4498E−06 |
| S20 | −2.6520E−03 | 1.4252E−03 | −2.6536E−04 | 2.4350E−05 | −1.2563E−06 |

| Surface number | A14 | A16 | A18 | A20 |
|---|---|---|---|---|
| S1 | 1.5198E−05 | −6.4753E−07 | 0.0000E+00 | 0.0000E+00 |
| S2 | 1.7643E−04 | −7.4850E−06 | −1.2388E−07 | 0.0000E+00 |
| S3 | 7.7671E−05 | −2.7075E−06 | 0.0000E+00 | 0.0000E+00 |
| S4 | −2.3486E−04 | 1.2974E−05 | 2.3681E−07 | 0.0000E+00 |
| S5 | −2.4384E−04 | 1.2129E−05 | 5.2615E−07 | 0.0000E+00 |
| S6 | 1.6794E−04 | −6.4956E−06 | −5.2201E−07 | 0.0000E+00 |
| S7 | −2.1659E−04 | 1.7922E−05 | 0.0000E+00 | 0.0000E+00 |
| S8 | −1.3279E−04 | 1.2843E−05 | 0.0000E+00 | 0.0000E+00 |
| S9 | −3.3470E−04 | 2.5544E−05 | 1.6140E−06 | 0.0000E+00 |
| S10 | −9.0978E−05 | 5.6349E−06 | 1.2345E−09 | 0.0000E+00 |
| S11 | −6.7565E−05 | −3.3806E−07 | −3.9320E−09 | 0.0000E+00 |
| S12 | 1.0811E−05 | −1.3019E−06 | −7.0737E−09 | 0.0000E+00 |
| S13 | −9.4231E−07 | 2.5778E−08 | −8.7689E−12 | 0.0000E+00 |
| S14 | 1.2052E−06 | −2.1858E−08 | −1.6053E−10 | 0.0000E+00 |
| S15 | −3.6993E−06 | 7.7100E−08 | 2.8434E−10 | 0.0000E+00 |
| S16 | −1.7364E−06 | 2.7332E−08 | 1.1264E−10 | 2.3996E−12 |
| S17 | 4.8223E−08 | −7.1311E−10 | −9.4205E−13 | 0.0000E+00 |
| S18 | −4.2065E−08 | 5.7717E−10 | 0.0000E+00 | 0.0000E+00 |
| S19 | −6.2143E−08 | 2.0989E−09 | −6.4036E−11 | 1.1237E−12 |
| S20 | 3.4504E−08 | −3.8233E−10 | −2.8775E−13 | 0.0000E+00 |

Figure 12A:
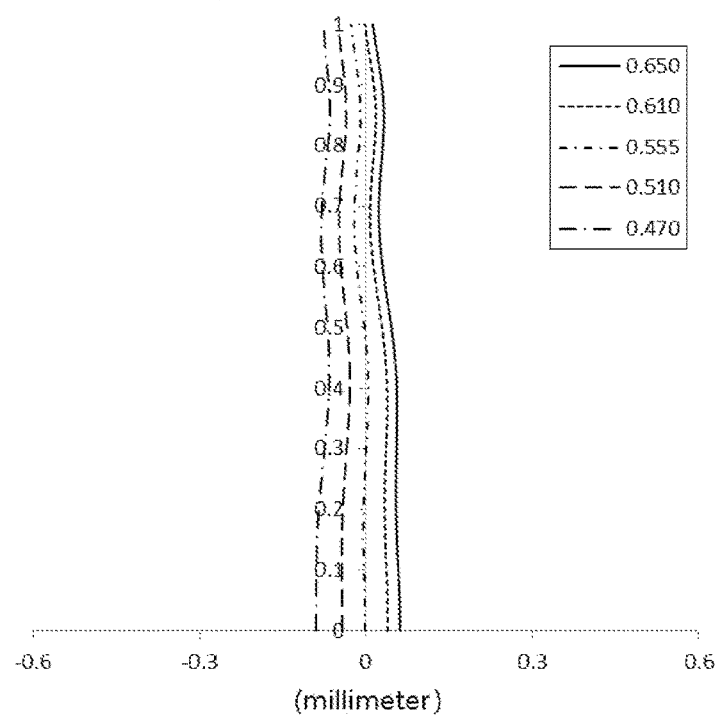
FIG. 12A to FIG. 12C show a longitudinal aberration curve, an astigmatism curve, and a distortion curve of an optical imaging lens assembly according to embodiment 6 respectively.
Figure 12B:
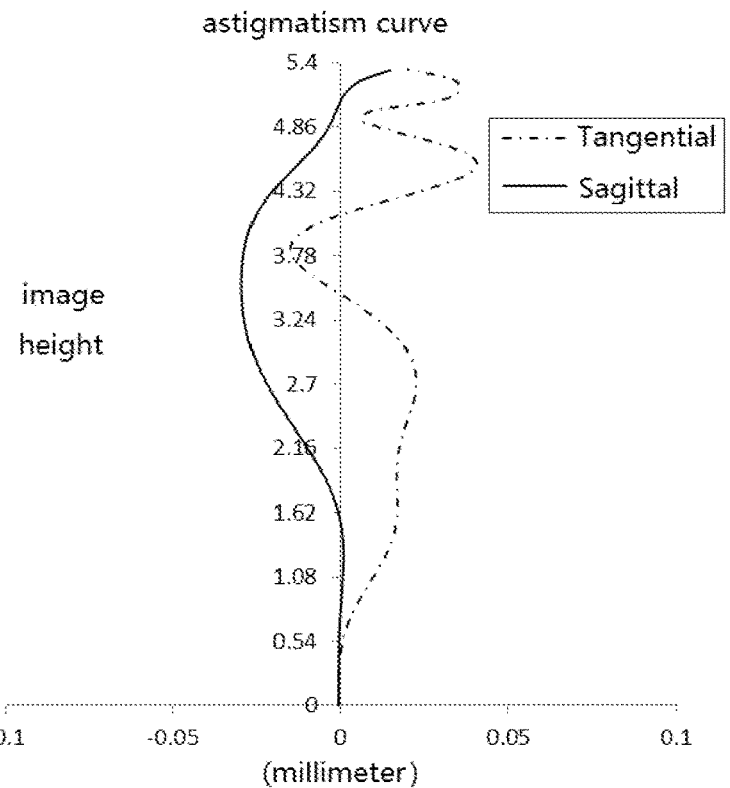
Figure 12C:
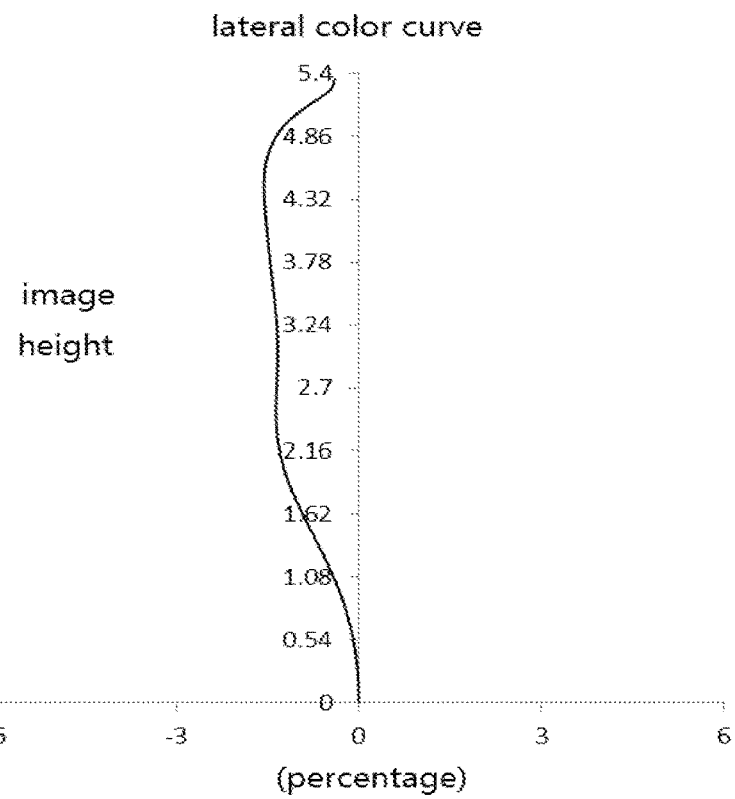

FIG. 12A shows a longitudinal aberration curve of the optical imaging lens assembly according to embodiment 6 to represent deviation of a convergence focal point after light with different wavelengths passes through the lens. FIG. 12B shows an astigmatism curve of the optical imaging lens assembly according to embodiment 6 to represent a meridian image surface curvature and a sagittal image surface curvature. FIG. 12C shows a distortion curve of the optical imaging lens assembly according to embodiment 6 to represent distortion values corresponding to different image heights. According to FIG. 12A to FIG. 12C, it can be seen that the optical imaging lens assembly provided in embodiment 6 may achieve high imaging quality.

From the above, embodiment 1 to embodiment 6 meet a relationship shown in Table 13 respectively.

TABLE 13

| Conditional expression | embodiment | | | | | |
|---|---|---|---|---|---|---|
| | 1 | 2 | 3 | 4 | 5 | 6 |
| TTL/EPD | 1.83 | 1.87 | 1.83 | 1.91 | 1.93 | 1.92 |
| f1/f3 × 10 | −0.90 | −0.44 | −0.25 | −0.92 | −0.61 | −1.07 |
| (R3 + R4)/f2 | 0.01 | 0.41 | 0.07 | 0.77 | 4.63 | 1.20 |
| (f6 + f10)/f8 | 0.81 | 1.18 | 0.89 | 0.69 | 0.67 | 0.78 |
| f7/f9 | 1.40 | 1.59 | 1.48 | 2.35 | 2.26 | 2.13 |
| f/EPD | 1.31 | 1.35 | 1.32 | 1.41 | 1.43 | 1.42 |
| ImgH/(CT9 + T910) | 2.05 | 2.06 | 1.94 | 2.38 | 2.39 | 2.46 |
| f123/f | 2.17 | 2.01 | 1.80 | 1.93 | 1.62 | 1.87 |
| f78/f1234 | 1.51 | 1.84 | 1.48 | 2.64 | 2.21 | 2.15 |
| f12/f56 | −0.57 | −0.63 | −0.38 | −0.38 | −0.20 | −0.53 |
| SAG32/SAG42 | 1.45 | 1.39 | 1.34 | 1.45 | 1.19 | 1.58 |
| SAG101/SAG102 | 4.73 | 4.91 | 3.24 | 2.11 | 2.96 | 2.77 |

The disclosure also provides an imaging device, which is provided with an electronic photosensitive element for imaging. The electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis,
a first lens with a positive refractive power, and an object-side surface of the first lens is a convex surface, an image-side surface of the first lens is a concave surface;
a second lens with a positive refractive power, and an object-side surface of the second lens is a convex surface, an image-side surface of the second lens is a concave surface;
a third lens with a negative refractive power, and an object-side surface of the third lens is a convex surface, an image-side surface of the third lens is a concave surface;
a fourth lens, and an object-side surface of the fourth lens is a convex surface, an image-side surface of the fourth lens is a concave surface;
a fifth lens, and an object-side surface of the fifth lens is a convex surface;
a sixth lens, and an image-side surface of the sixth lens is a concave surface;
a seventh lens with a positive refractive power, and an object-side surface of the seventh lens is a concave surface, an image-side surface of the seventh lens is a convex surface;
an eighth lens with a negative refractive power, and an object-side surface of the eighth lens is a concave surface, an image-side surface of the eighth lens is a convex surface;
a ninth lens with a positive refractive power, and an object-side surface of the ninth lens is a convex surface, an image-side surface of the ninth lens is a convex surface;
a tenth lens with a negative refractive power, and an object-side surface of the tenth lens is a concave surface;
wherein a spacing distance TTL from the object-side surface of the first lens to an imaging surface of the optical imaging lens assembly on the optical axis and an Entrance Pupil Diameter (EPD) of the optical imaging lens assembly meet:

$TTL/EPD<2.0$;

an effective focal length f1 of the first lens and an effective focal length f3 of the third lens meet:

$-1.5<f1/f3\times10<0$.

2. The optical imaging lens assembly according to claim 1, wherein a curvature radius R3 of the object-side surface of the second lens, a curvature radius R4 of the image-side surface of the second lens, and an effective focal length f2 of the second lens meet:

$0<(R3+R4)/f2<4.7$.

3. The optical imaging lens assembly according to claim 1, wherein an effective focal length f6 of the sixth lens, an effective focal length f10 of the tenth lens, and an effective focal length f8 of the eighth lens meet:

$0.5<(f6+f10)/f8<1.3$.

4. The optical imaging lens assembly according to claim 1, wherein an effective focal length f7 of the seventh lens and an effective focal length f9 of the ninth lens meet:

$1.3<f7/f9<2.4$.

5. The optical imaging lens assembly according to claim 1, wherein a total effective focal length f of the optical imaging lens assembly and the Entrance Pupil Diameter (EPD) of the optical imaging lens assembly meet:

$f/EPD<1.5$.

6. The optical imaging lens assembly according to claim 1, wherein ImgH is a half of a diagonal length of an effective pixel region on the imaging surface of the optical imaging lens assembly, a center thickness CT9 of the ninth lens on the optical axis, and a spacing distance T910 of the ninth lens and the tenth lens on the optical axis and ImgH meet:

$1.8<ImgH/(CT9+T910)<2.6$.

7. The optical imaging lens assembly according to claim 1, wherein a combined focal length f123 of the first lens, the second lens, and the third lens, and a total effective focal length f of the optical imaging lens assembly meet:

$1.5<f123/f<2.5$.

8. The optical imaging lens assembly according to claim 1, wherein a combined focal length f78 of the seventh lens and the eighth lens and a combined focal length f1234 of the first lens, the second lens, the third lens, and the fourth lens meet:

$$1.4<f8/f1234<2.7.$$

9. The optical imaging lens assembly according to claim 1, wherein a combined focal length f12 of the first lens and the second lens and a combined focal length f56 of the fifth lens and the sixth lens meet:

$$-0.7<f12/f56<-0.1.$$

10. The optical imaging lens assembly according to claim 1, wherein an on-axis distance SAG32 from an intersection point of the image-side surface of the third lens and the optical axis to an effective radius vertex of the image-side surface of the third lens and an on-axis distance SAG42 from an intersection point of the image-side surface of the fourth lens and the optical axis to an effective radius vertex of the image-side surface of the fourth lens meet:

$$1.1<SAG32/SAG42<1.6.$$

11. The optical imaging lens assembly according to claim 1, wherein an on-axis distance SAG101 from an intersection point of the object-side surface of the tenth lens and the optical axis to an effective radius vertex of the object-side surface of the tenth lens and an on-axis distance SAG102 from an intersection point of an image-side surface of the tenth lens and the optical axis to an effective radius vertex of the image-side surface of the tenth lens meet:

$$2.1<SAG101/SAG102<5.0.$$

12. The optical imaging lens assembly according to claim 1, wherein there is an air space between any two adjacent lenses in the first lens to the tenth lens on the optical axis.

13. An optical imaging lens assembly, sequentially comprising, from an object side to an image side along an optical axis,
   a first lens with a positive refractive power, and an object-side surface of the first lens is a convex surface, an image-side surface of the first lens is a concave surface;
   a second lens with a positive refractive power, and an object-side surface of the second lens is a convex surface, an image-side surface of the second lens is a concave surface;
   a third lens with a negative refractive power, and an object-side surface of the third lens is a convex surface, an image-side surface of the third lens is a concave surface;
   a fourth lens, and an object-side surface of the fourth lens is a convex surface, an image-side surface of the fourth lens is a concave surface;
   a fifth lens, and an object-side surface of the fifth lens is a convex surface;
   a sixth lens, and an image-side surface of the sixth lens is a concave surface;
   a seventh lens with a positive refractive power, and an object-side surface of the seventh lens is a concave surface, an image-side surface of the seventh lens is a convex surface;
   an eighth lens with a negative refractive power, and an object-side surface of the eighth lens is a concave surface, an image-side surface of the eighth lens is a convex surface;
   a ninth lens with a positive refractive power, and an object-side surface of the ninth lens is a convex surface, an image-side surface of the ninth lens is a convex surface;
   a tenth lens with a negative refractive power, and an object-side surface of the tenth lens is a concave surface;
   wherein an effective focal length f1 of the first lens and an effective focal length f3 of the third lens meet:

$$-1.5<f1/f3\times10<0.$$

14. The optical imaging lens assembly according to claim 13, wherein a curvature radius R3 of the object-side surface of the second lens, a curvature radius R4 of the image-side surface of the second lens, and an effective focal length f2 of the second lens meet:

$$0<(R3+R4)/f2<4.7.$$

15. The optical imaging lens assembly according to claim 14, wherein a spacing distance TTL from the object-side surface of the first lens to an imaging surface of the optical imaging lens assembly on the optical axis and an Entrance Pupil Diameter (EPD) of the optical imaging lens assembly meet:

$$TTL/EPD<2.0.$$

16. The optical imaging lens assembly according to claim 13, wherein an effective focal length f6 of the sixth lens, an effective focal length f10 of the tenth lens, and an effective focal length f8 of the eighth lens meet:

$$0.5<(f6+f10)/f8<1.3.$$

17. The optical imaging lens assembly according to claim 13, wherein an effective focal length f7 of the seventh lens and an effective focal length f9 of the ninth lens meet:

$$1.3<f7/f9<2.4.$$

18. The optical imaging lens assembly according to claim 13, wherein a total effective focal length f of the optical imaging lens assembly and the Entrance Pupil Diameter (EPD) of the optical imaging lens assembly meet:

$$f/EPD<1.5.$$

* * * * *